United States Patent
Eidelberg et al.

(10) Patent No.: US 10,307,980 B2
(45) Date of Patent: Jun. 4, 2019

(54) TIRE BUILDING APPLICATOR MEMBERS AND SYSTEMS

(71) Applicant: The Goodyear Tire & Rubber Company, Akron, OH (US)

(72) Inventors: Boaz E. Eidelberg, Smithtown, NY (US); Mark A. Sieverding, Uniontown, OH (US); Robert T. Irwin, North Canton, OH (US); Max Joel Miller, Jr., Uniontown, OH (US); Robert D. Irwin, Uniontown, OH (US); Peter Bruder, Smithtown, NY (US); James Wiley, Cotati, CA (US); James M. Dunn, Irwin, PA (US); Brad Kraus, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 281 days.

(21) Appl. No.: 13/771,410

(22) Filed: Feb. 20, 2013

(65) Prior Publication Data

US 2014/0231024 A1     Aug. 21, 2014

(51) Int. Cl.
   *B29D 30/16*     (2006.01)
(52) U.S. Cl.
   CPC ................ *B29D 30/1635* (2013.01)
(58) Field of Classification Search
   CPC ........ B29D 30/16; B29D 30/14; B29D 30/35; B29D 30/1635; B29D 30/3035
   (Continued)

(56) References Cited

U.S. PATENT DOCUMENTS 724,571 A  *  4/1903  Greenfield ........... H01B 13/262
                                                   29/728
2,432,630 A     12/1947  Purdy
(Continued)

FOREIGN PATENT DOCUMENTS

FR    2975040   * 11/2012   ............. B29D 30/60
GB     808342   *  2/1959   ............. B29D 30/38
(Continued)

OTHER PUBLICATIONS

English language Abstrac for JP 58-134831 (original document dated Aug. 1983).*
(Continued)

*Primary Examiner* — Michael H. Wilson
(74) *Attorney, Agent, or Firm* — Wood Herron & Evans LLP

(57) ABSTRACT

An applicator assembly for applying a cord to a tire-building surface that rotates during tire construction. The applicator assembly includes an applicator member to apply the cord. A first rotary device rotates the applicator member about a first axis that is transverse to the surface. A first translation device moves the applicator member in a first linear path relative to the surface. The applicator member may include a roller and/or a resilient member. A second rotary device may rotate the applicator member and the first rotary device around a second axis substantially perpendicular to the first axis. A second translation device may move the applicator member, the first rotary device, the second rotary device, and the first translation device. A system for applying the cord to a core member may further include a spindle to rotate the core member about the axis of rotation.

22 Claims, 14 Drawing Sheets

(58) Field of Classification Search
USPC .................. 156/117, 397, 408, 409, 410
See application file for complete search history.

(56) References Cited

U.S. PATENT DOCUMENTS

| | | | |
|---|---|---|---|
| 2,451,973 A | 10/1948 | Purdy | |
| 2,700,998 A | 2/1955 | Wallace | |
| 3,062,258 A | 11/1962 | Maiocchi | |
| 3,081,216 A | 3/1963 | Purdy | |
| 3,560,302 A | 2/1971 | Missioux | |
| 3,575,227 A | 4/1971 | Bartley | |
| 3,607,558 A | 9/1971 | Nebout | |
| 3,620,867 A | 11/1971 | Bartley | |
| 3,628,586 A | 12/1971 | Curtiss | |
| 3,684,621 A | 8/1972 | Frazier et al. | |
| 3,767,509 A | 10/1973 | Gazuit | |
| 3,770,041 A | 11/1973 | Abbott | |
| 3,780,783 A | 12/1973 | Curtiss, Jr. | |
| 3,833,445 A | 9/1974 | Mallory et al. | |
| 4,042,076 A * | 8/1977 | Citelli | 188/80 |
| 4,361,454 A * | 11/1982 | Nakahama et al. | 156/133 |
| 4,507,046 A * | 3/1985 | Sugimoto | B25J 9/046 414/4 |
| 4,869,773 A * | 9/1989 | Perkins | 156/397 |
| 5,395,475 A * | 3/1995 | Ozawa | B29C 53/8016 156/117 |
| 5,525,777 A * | 6/1996 | Kukuljan | B23K 1/0056 219/121.65 |
| 5,811,951 A * | 9/1998 | Young | 318/568.2 |
| 6,068,721 A | 5/2000 | Dyer et al. | |
| 6,250,356 B1 | 6/2001 | Cordaillat et al. | |
| 6,318,432 B1 | 11/2001 | Caretta et al. | |
| 6,328,836 B1 | 12/2001 | Ogawa | |
| 6,372,070 B1 * | 4/2002 | Iizuka et al. | 156/117 |
| 6,386,258 B1 | 5/2002 | Dyer et al. | |
| 6,623,582 B1 | 9/2003 | Ogawa | |
| 6,887,327 B2 | 5/2005 | Mayet | |
| 6,913,058 B1 * | 7/2005 | Takagi | 156/397 |
| 6,976,520 B2 | 12/2005 | Mayet | |
| 7,285,176 B2 | 10/2007 | Mayet | |
| 7,343,952 B2 | 3/2008 | Hinc | |
| 7,449,078 B2 | 11/2008 | Mayet | |
| 7,686,053 B2 | 3/2010 | Delgado et al. | |
| 7,740,039 B2 | 6/2010 | Weissert et al. | |
| 7,753,098 B2 | 7/2010 | Delgado et al. | |
| 7,833,374 B2 | 11/2010 | Girard et al. | |
| 8,221,569 B2 * | 7/2012 | Iwasaki | 156/117 |
| 2002/0003020 A1 * | 1/2002 | Debroche | B21F 11/00 156/121 |
| 2004/0079487 A1 | 4/2004 | Marchini et al. | |
| 2004/0154727 A1 | 8/2004 | Weissert et al. | |
| 2005/0067107 A1 | 3/2005 | Hitotsuyanagi et al. | |
| 2005/0076993 A1 | 4/2005 | Pialot | |
| 2005/0077011 A1 | 4/2005 | Pialot | |
| 2005/0126684 A1 | 6/2005 | Sieverding et al. | |
| 2005/0183810 A1 | 8/2005 | Abe et al. | |
| 2005/0269014 A1 | 12/2005 | Mizota | |
| 2006/0090836 A1 | 5/2006 | Caretta et al. | |
| 2006/0162848 A1 | 7/2006 | Weissert et al. | |
| 2008/0000574 A9 | 1/2008 | Pialot | |
| 2008/0056859 A1 * | 3/2008 | Inoue | B25J 19/0029 414/222.01 |
| 2008/0257476 A1 * | 10/2008 | Pozzati et al. | 156/64 |
| 2009/0266489 A1 * | 10/2009 | Koyama | 156/397 |
| 2011/0146871 A1 * | 6/2011 | Laske | B29D 30/1635 152/517 |
| 2011/0146876 A1 | 6/2011 | Landers et al. | |

FOREIGN PATENT DOCUMENTS

| | | | | |
|---|---|---|---|---|
| JP | 58-134731 | * | 8/1983 | ............ B29H 17/18 |
| JP | 11-198247 | * | 7/1999 | ............ B29D 30/28 |
| JP | 2004-345191 | * | 12/2004 | ............ B29D 30/28 |
| JP | 2004-358757 | * | 12/2004 | ............ B29D 30/38 |
| JP | 2004-358760 | * | 12/2004 | ............ B29D 30/30 |
| JP | 2009-23141 | * | 2/2009 | ............ B29D 30/30 |
| WO | WO 01/43957 | * | 6/2001 | ............ B29D 30/48 |

OTHER PUBLICATIONS

Machine generated English language translation of JP 2004-358757 (original document dated Dec. 2004).*
Machine generated English language translation of JP 2004-345191 (original document dated Dec. 2004).*
Machine generated English language translation of JP 11-198247 (original document dated Jul. 1999).*
Machine generated English langauge translation of JP 2004-358760 (original document dated Dec. 2004).*
Machine generated English language translation of JP 2009-23141 (original document dated Feb. 2009).*
U.S. Patent and Trademark Office, Office Action in U.S. Appl. No. 10/365,374 dated Dec. 14, 2004.
U.S. Patent and Trademark Office, Office Action in U.S. Appl. No. 10/365,374 dated Oct. 5, 2005.
U.S. Patent and Trademark Office, Office Action in U.S. Appl. No. 11/390,675 dated Jul. 7, 2010.
U.S. Patent and Trademark Office, Office Action in U.S. Appl. No. 11/390,675 dated Oct. 21, 2010.

* cited by examiner

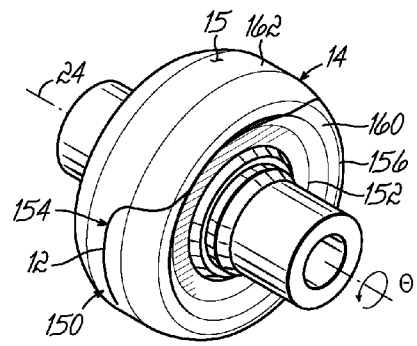
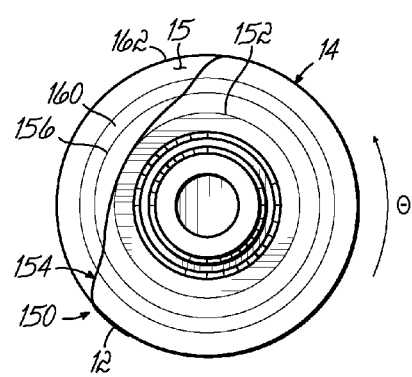
FIG. 11A  FIG. 11B
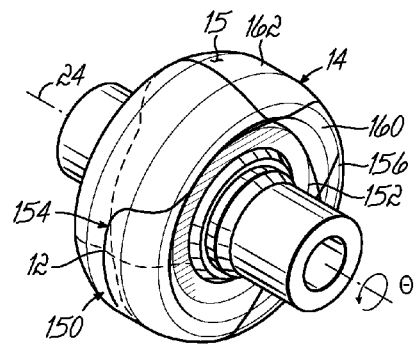
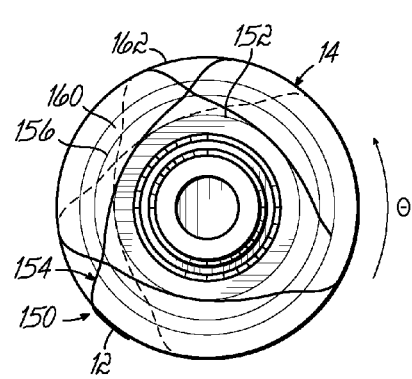
FIG. 12A  FIG. 12B
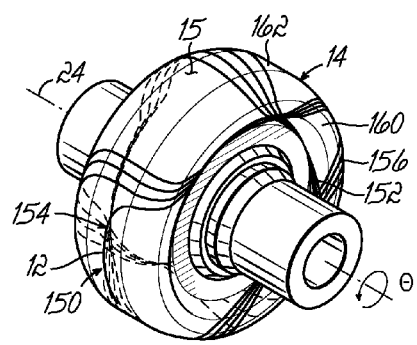
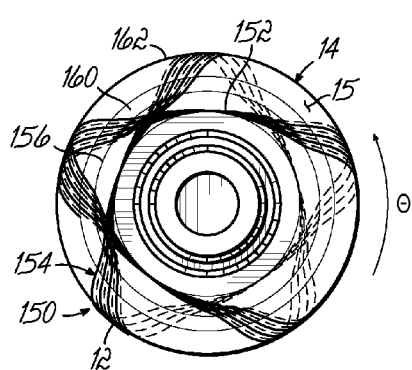
FIG. 13A  FIG. 13B

TIRE BUILDING APPLICATOR MEMBERS AND SYSTEMS

TECHNICAL FIELD

The present invention relates to apparatuses for manufacturing tires, and more specifically, applicator assemblies and systems for applying cords to a tire-building surface.

BACKGROUND

A pneumatic tire is a laminate, composite structure having an open toroidal-like shape. The toroidal-like shape includes a so-called carcass, which contains numerous components, to which a belt package and/or reinforcement and a tread are added to form the tire. Each of the carcass, belt package, and tread is made of rubber, fabric, and/or steel. Thus, at least collectively they form a composite structure.

During tire manufacturing, the individual components that form the carcass are often layered or placed on one another. Specifically, in an initial stage of manufacturing, the carcass is assembled by placing one or more plies or strips of a green rubber material onto a building drum. Some of the plies typically contain reinforcement strands or cords. Placement of the plies may generally involve stacking flat strips of various materials on the building drum and cutting the strips to length. The cut ends of the strips meet or overlap and create a splice or joint at one location. In this manner, a pair of sidewalls, a pair of apexes, an innerliner (for a tubeless tire), a pair of chafers, and a pair of gum shoulder strips may be placed on the building drum to construct the laminate structure that is the carcass. Additional components may be used or be substituted for some of the components mentioned above.

In subsequent processes, the carcass is transformed from a stack of flat strips into a green tire. Before this occurs, however, additional manufacturing steps may include folding a portion of the stack over the bead cores to form ply turnups. The carcass is eventually expanded into the toroidal shape at which point the reinforcing belts and the tread may be added. In the expanded state, the reinforcement threads in the plies generally run perpendicularly or radially to the centerline of the tire. For this reason, this type of tire is referred to as a "radial" tire. The resulting tire is made by curing the above-constructed green tire at a temperature and pressure sufficient to cure curable components. Building a tire by expanding an initially cylindrical carcass is not without manufacturing difficulties.

In view of difficulties with current tire manufacturing, an improved method for manufacturing tires and corresponding apparatus is sought. One method involves applying an elastomeric layer on a toroidal surface or core member and then placing and stitching a cord in continuous lengths onto the toroidal surface in a predetermined cord path. Each cord is essentially a string of one or more materials as opposed to being a flat sheet. The cords are stitched to the elastomeric layer while the path is followed. As such, the application process may include dispensing a cord from a spool thereof and guiding the cord in the predetermined path onto the core member. The core member may generally take the form of the tire, though smaller in size, and ultimately forms the inside surface of the resulting tire.

A system for stitching the cords to the elastomeric layer may include a tooling head and a means for positioning the tooling head relative to the core member, which may incrementally move as the core is stitched to the elastomeric layer. Bi-directional tooling heads are known to be used to stitch cords to a core member in a generally a side-to-side or radial looping pattern as the core member incrementally advances. Once all of the layers of cord are positioned, additional components, such as a belt-and-tread assembly, may be added to the stitched cord and elastomeric layer structure thereby forming a green tire. The green tire may undergo a similar curing operation as in conventional tire building. The cord application process, while effective, is not without its own challenges.

One such challenge is associated with maintaining an optimum amount of pressure between the cord and the elastomeric layer. Too little pressure may result in insufficient stitching and too much pressure may damage the cord or may damage the underlying elastomeric layer. Furthermore, consistent pressure application in conjunction with complex motions requires a specialized tooling head design.

In addition to difficulties with designing the tooling head itself, the ongoing problems with too little or too much pressure may be exacerbated by how the tooling head is positioned relative to the elastomeric layer or a previously applied cord. Attempts to utilize commercially available six-axis robots have been unsuccessful because placement accuracy, particularly at the speeds necessary to manufacture an economically viable tire, is unacceptable. Generally, the error in position is a result of a "stack-up" of errors for each individual axis to the application surface of the tooling head. Any stack-up is further magnified as the axes move to attempt to maintain the desired orientation of the tooling head with the toroidal surface. The overall result being an unacceptable degree of error that may result in the issues with cord placement and may damage the cord.

In addition to radial cord application, cords may be applied onto a tire-building surface in a geodesic pattern. Yet, geodesic patterns present a most-difficult pattern, particularly where the tire-building surface is defined by both concave and convex curves. The transition between curvatures creates application issues. For example, the cord may not be properly adhered to the surface in this region. For at least this reason, mass produced, affordable tires containing geodesic cord patterns have thus far eluded tire manufacturers.

A need, accordingly, remains for applicator assemblies and systems that are simple to construct, are operationally reliable, and are yet economically efficient while being accurate in application of a cord to a toroidal surface.

SUMMARY

In one embodiment, there is an applicator assembly for applying a cord to a tire-building surface that is configured to rotate about an axis during tire construction. The applicator assembly includes an applicator member with an application surface configured to apply the cord to the tire-building surface. A first rotary device is operatively coupled to the applicator member and is configured to rotate the applicator member about a first axis that is transverse to the application surface. A first translation device is operatively coupled to the applicator member and is configured to move the applicator member in a first linear path relative to the tire-building surface.

In one embodiment, the applicator assembly further includes a resilient member operatively coupled to the applicator member. The resilient member is configured to compress when the applicator member applies the cord to the tire-building surface. In one embodiment, the resilient member is compressible along a second axis parallel to the first axis. In one embodiment, the second axis is offset from the first axis.

In one embodiment, the applicator member is a roller and is configured to rotate about a roller axis oriented substantially perpendicular to the first axis. The applicator member includes a pair of resilient members. Each resilient member is configured to compress when the applicator member applies the cord to the tire-building surface. The pair of resilient members is in a non-collinear relationship with the first axis.

In one embodiment, the applicator assembly further includes a second rotary device that is operatively coupled to the applicator member. The second rotary device is configured to rotate the applicator member and the first rotary device around a second axis substantially perpendicular to the first axis. The first translation device is configured to move the applicator member, the first rotary device, and the second rotary device in a first linear path relative to the tire-building surface. The assembly further includes a second translation device that is operatively coupled to the applicator member and is configured to move the applicator member, the first rotary device, the second rotary device, and the first translation device in a second linear path substantially transverse to the first linear path.

In one embodiment, there is a system for applying a cord to a core member having a tire-building surface and an axis of rotation about which the core member rotates. The system includes a spindle that is configured to rotate the core member about the axis of rotation and an embodiment of the applicator assembly. As the spindle rotates the core member, the first rotary device, and the first translation device are configured to move the applicator member in a predetermined manner relative to a position of the core member to apply the cord in a predetermined pattern to the tire-building surface.

DEFINITIONS

"Bead" means a circumferentially substantially inextensible tensile member, such as a metal wire assembly, that forms the core of the bead area, and is associated with holding a tire to a rim for mounting on a vehicle.

"Carcass" means the tire structure apart from the belt structure, tread, undertread, but includes the sidewall rubber, the plies, and the beads.

"Cord" means one of the reinforcement strands of which the plies in the tire are comprised.

"Ply" or "Plies" means a calendared fabric thread coated with rubber, the threads in the plies being generally parallel to one another.

"Green" means material, typically rubber, which has not undergone a curing or pre-curing process.

"Pneumatic Tire" means a laminated mechanical device of generally toroidal shape, usually an open torus, having beads and a tread and made of rubber, chemicals, fabric, and steel or other materials. When mounted on the rim of a motor vehicle, the tire through its tread provides traction and contains the fluid that sustains the vehicle load.

"Sidewall" means that portion of a tire between the tread and the bead area.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Tread" means a molded rubber component which includes the portion of the tire that comes into contact with the road when the tire is normally inflated and under normal load.

"Winding" means a wrapping of a material under tension onto a surface along a predetermined path.

BRIEF DESCRIPTION OF THE DRAWINGS

The invention will be described by way of example and with reference to the accompanying drawings in which:

FIGS. 11A and 11B, 12A and 12B, and 13A and 13B are perspective and side elevation views, respectively, of a core member with the cord applied thereto depicting one sequence of the winding process according to one embodiment of the invention.

DETAILED DESCRIPTION

Figure 1:
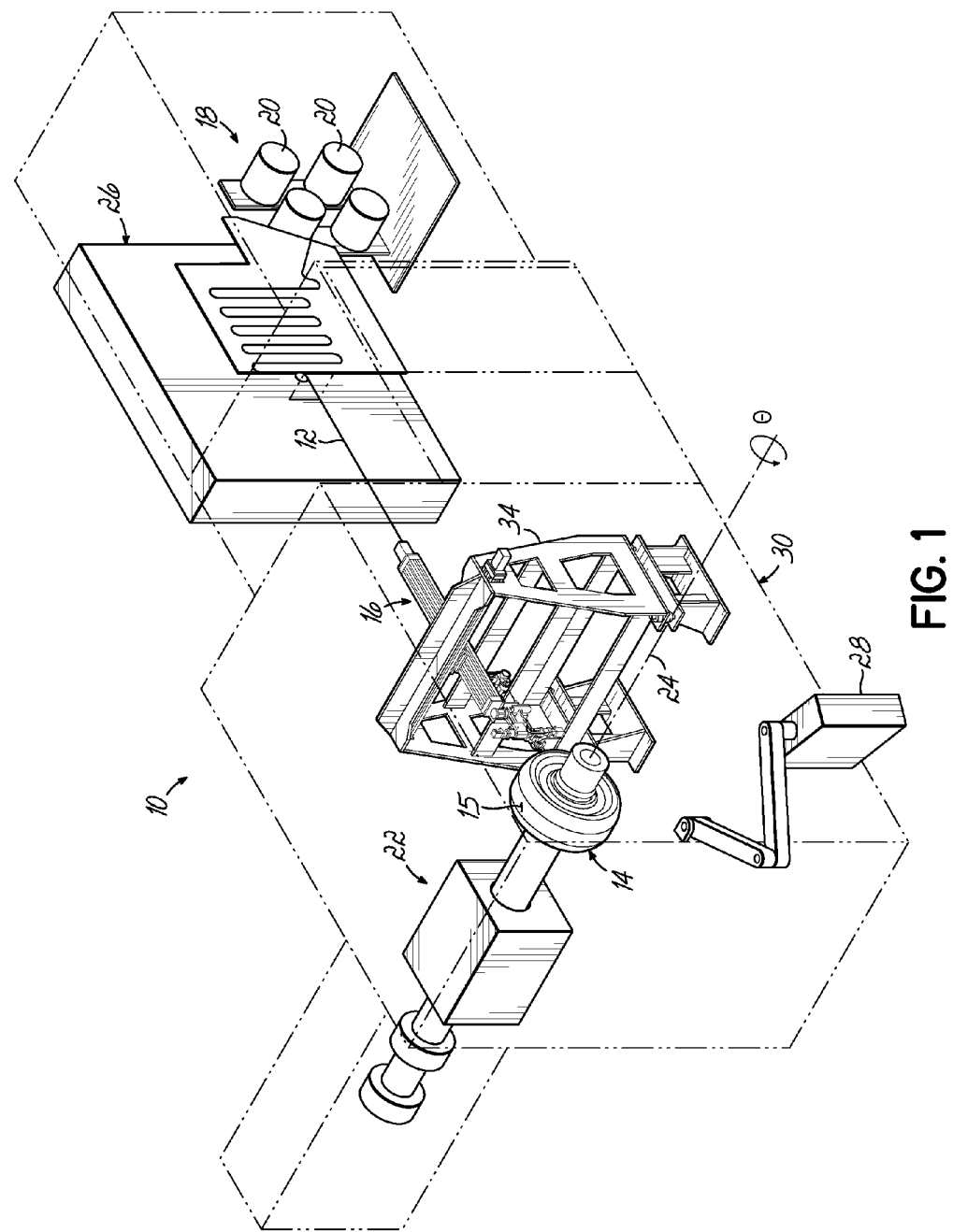
FIG. 1 is a perspective view of a cord winding system according to one embodiment of the invention.

With reference to FIG. 1, a winding cell or system 10 for winding a cord 12 on a core member 14 may include a toroidal-like or tire-building surface 15. As described in detail below, the system 10 is utilized during the manufacturing of pneumatic tires by applying the cord 12 according to a predetermined path to the toroidal-like surface of the core member 14. The predetermined path may be a portion of an overall predetermined pattern or design covering at least a portion of the surface with a single continuous cord length thereby forming an applied layer on the core member 14. The applied layer may form at least a portion of the carcass of a pneumatic tire. For example, the applied layer may form a ply of the tire, and additional components, such as, a belt-and-tread package, may be added to the applied layer before the green tire is cured.

In this regard, the system 10 may be used to apply the cord 12 to a variety of surface configurations. As set forth in detail below, the system 10 is a high speed, highly accurate winding cell for application of the cord 12 to the core member 14. Generally the core member 14 may form the interior surface of the resulting pneumatic tire. As such, the core member 14 may have any one of a number of configurations. For example, the core member 14 may have a contour sufficient to substantially form the interior of a passenger tire, light or medium truck tire, aircraft tire, OTR tire, all-terrain vehicle tire, motorcycle tire, and mini spare tire, to name only a few. In this regard, the core member 14 may be scaled to the targeted tire size required and furthermore may be sized to accommodate the full range of all tires within a family of similar sized tires. By way of example only and not limitation, medium truck radial tires may include, for example, 10.00 R 20, 11 R 22.5, 275/80 R 22.5, 275/70 R 22.5, and 285/60 R 22.5 tires. As such, the core member 14, as detailed below, may have a cross-sectional configuration with reverse curvature. However, it will be appreciated that the core member 14 is not limited to the configurations shown in the figures.

In view of the various configurations of the core member 14, the system 10 is capable of applying the cord 12 according to a predetermined pattern or path that is specific to the configuration of the core member 14 and may do so with sufficient accuracy and may properly apply the cord 12 to the core member 14 during the winding process. By way of example, a predetermined path may include geodesic cord paths and simulated geodesic paths, which are known according to U.S. Pat. No. 6,068,721, which is incorporated by reference herein in its entirety. A geodesic cord path represents the shortest path between a point on one bead to a given point on the other bead of the carcass. A tire constructed with a geodesic cord pattern may have many desirable qualities, for instance, increased separation resistance, reduced operating temperature, lower rolling resistance, reduced weight, and improved traction due to more latitude in tread compounding, to name only a few. Moreover, such tires may provide improved ride characteristics and improved bead durability. Generally, in view of application of geodesic cord paths, one embodiment of the system 10 will now be further described.

To these and other ends and with continued reference to FIG. 1, in one embodiment, the system 10 includes an applicator assembly 16, described in detail below, for applying the cord 12 to the core member 14 and may include a letoff unit 18 for supplying the cord 12 from one or more spools 20 to the applicator assembly 16. The letoff unit 18 may also provide tension to the cord 12, and, in situations in which the cord 12 includes a release sheet or film or other means for preventing adhesion of the cord 12 to itself when wound on each spool 20, the letoff unit 18 may strip the release sheet from the cord 12 before it reaches the applicator assembly 16. A release sheet may allow the cord 12 to be delivered to the applicator assembly 16 without damaging the cord 12 during unwinding of the cord 12 from each spool 20. The system 10 may further include a headstock unit 22 for rotating the core member 14 around an axis of rotation 24 to various positions designated "Θ" herein. The headstock unit 22 may be configured to rotate the core member 14 at a variable speed, as is described in more detail below with reference to FIGS. 9A-9D and 10. A control enclosure 26 that houses controls for controlling and coordinating operation of the headstock unit 22 and the applicator assembly 16 with the letoff unit 18 may be positioned proximate the letoff unit 18, as shown, though alternate locations are possible.

As shown in FIG. 1, a human-machine interface (HMI) pendant 28 may be positioned to allow an operator to control the operation of the system 10. The HMI pendant 28 may be secured to a safety enclosure 30 (shown in phantom line). While the system 10 is described with reference to the letoff unit 18, control enclosure 26, and HMI pendant 28, these are exemplary structures. The system 10 is not limited to these specific structures as other methods may be used to supply cord material to the applicator assembly 16 and control the operation of the system 10 to wind the cord 12 on the core member 14.

In this regard, the cord 12 is generally a composite structure and may have a rectangular cross-sectional shape and may be nearly infinite in length. The cord 12 may include one or more fibers and/or wires, for example, of polyester, nylon, rayon, aramid, and/or metal, encased in an uncured polymer or a partially cured polymer, such as, green rubber commonly used in tire manufacturing. Because the cord 12, in its green, uncured state, is tacky, it may adhere to the surface of the core member 14 with light to moderate pressure. In one embodiment, the cord 12 contains from one to ten separately rubber-encased fibers and/or wires in a single cross section of the cord 12. However, the cord 12 may be uncoated. That is, the cord 12 may simply be a single wire or thread of material. By way of example, as shown in FIG. 8C, the cord 12 may include fibers or strings 13 encased in green rubber 17. It will be appreciated that the selection of the material and configuration of the cord 12 may depend on the design of the resulting tire. As such, references to the cord herein are not limited to any particular configuration unless stated otherwise.

Figure 2:
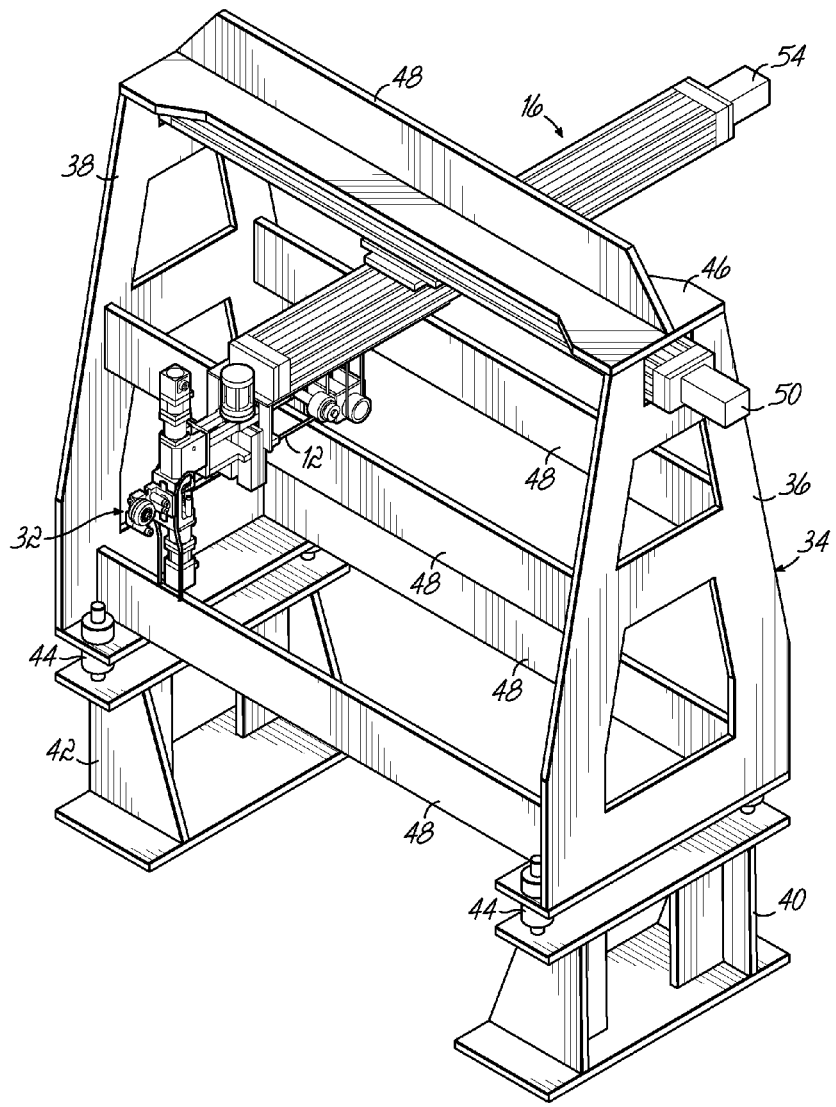
FIG. 2 is a perspective view of an applicator assembly affixed to a support frame according to one embodiment of the invention.

With reference to FIGS. 1 and 2, the applicator assembly 16 receives the cord 12 from, for example, the letoff unit 18, and applies the cord 12 in a predetermined pattern to the core member 14. It will be appreciated that while only a single applicator assembly 16 is shown in a position proximate the core member 14, the system 10 may include multiple assemblies 16 around the core member 14. In this regard, multiple assemblies may decrease the time required to complete the applied layer, though multiple, separate cords (one for each assembly 16) may be used. For example, a second applicator assembly (not shown) may be positioned in an opposing relationship and separated from the applicator assembly 16 shown by the core member 14. The second applicator assembly may apply a second continuous cord length onto the core member 14. Additional applicator assemblies or other equipment may be oriented around the core member 14.

Figure 3:
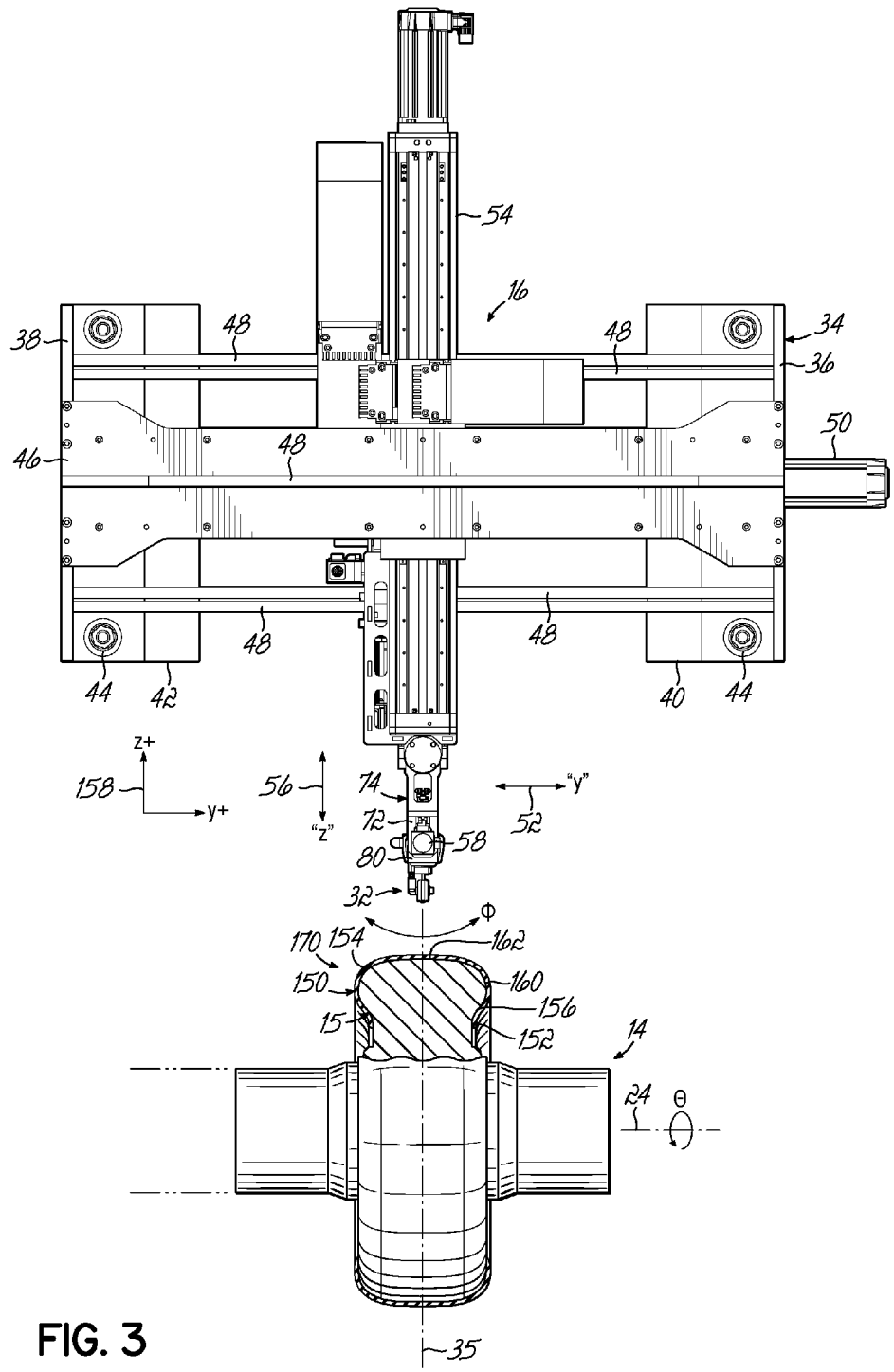
FIG. 3 is a plan view of the applicator assembly positioned relative to a partial cross-sectional view of a core member shown in FIG. 1.

With reference to FIGS. 2 and 3, in one embodiment, the applicator assembly 16 includes an applicator member 32, described in detail below, that is configured to apply the cord 12 to the tire-building surface 15 of the core member 14. The applicator assembly 16 is positioned proximate and oriented relative to the core member 14 for application of the cord 12 to the core member 14. For instance, as shown in FIGS. 2 and 3, the applicator assembly 16 may be secured to a frame 34 secured to the floor proximate the core member 14. The frame 34 holds the assembly 16 in a position relative to the core member 14 and provides a fixed support location from which the applicator member 32 may be moved relative to the core member 14.

By way of example, and with reference to FIG. 3, the frame 34 may be positioned to center the applicator assembly 16 relative to a center line 35 of the core member 14. The tire-building surface 15 of the core member 14 may be covered by a full range of motion of the applicator assembly 16. In this regard, in one embodiment, the frame 34 includes opposing A-shaped sides 36, 38 residing on corresponding base members 40, 42 via jack screws 44. The applicator assembly 16 may be secured to a top plate 46, which together with cross members 48 and when welded to sides 36, 38 forms the frame 34. In one embodiment, cross members 48, top plate 46, and/or sides 36, 38 are cut (e.g., with a laser) from a 1 inch thick steel plate to a dimensional accuracy of about +/−0.005 inches prior to welding. The frame 34 may be rigid under normal movement of the applicator member 32 during the application of the cord 12 to the core member 14.

Figure 4:
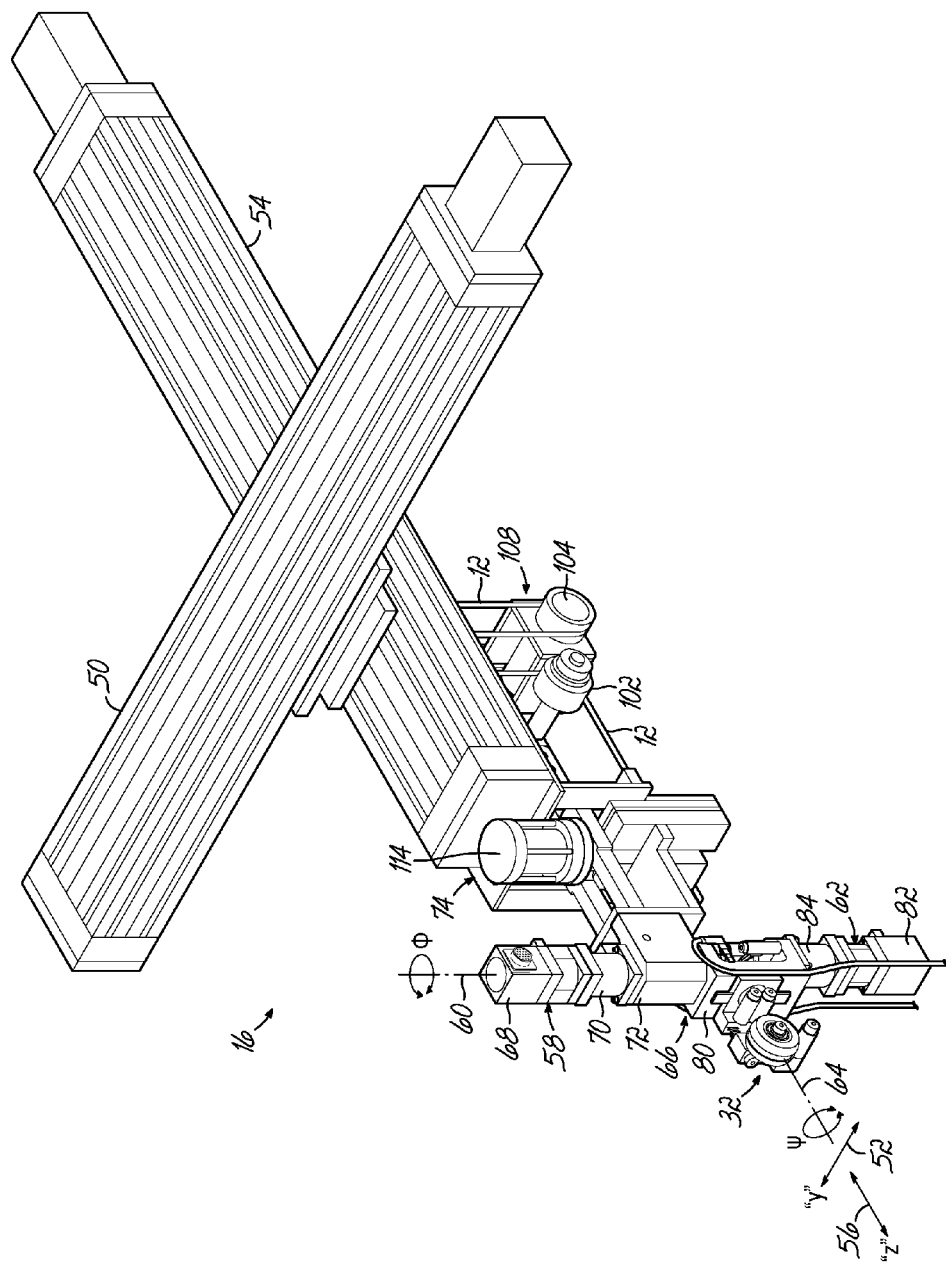
FIG. 4 is a perspective view of the applicator assembly of FIG. 3.

With regard to movement of the applicator member 32 and with reference to FIGS. 2-4, in one embodiment, the applicator assembly 16 may have four axes of motion or degrees of freedom. The movement of the applicator assembly 16 is synchronized together with the headstock unit 22 to apply cord 12 to surface 15. By way of example, the applicator assembly 16 may include a first device 50 capable of moving the applicator member 32 in a direction (indicated by arrow 52 in FIGS. 3 and 4). Movement in this direction is referenced as the "Y" direction herein. The device 50 may be secured to the top plate 46 of the frame 34, as shown. By way of example, movement in the Y direction according to first device 50 is along a substantially straight line or, in other words, linearly. Therefore, movement of the applicator member 32 by the first device 50 may be substantially parallel to the axis of rotation 24 (shown in FIG. 3). Commercially available devices capable of this movement are available from Parker-Hannifin in Cleveland, Ohio, and include the 404XR-412XR standard series positioners.

In the embodiment shown, a second device 54 may be operatively secured to the first device 50. The second device 54 is capable of moving the applicator member 32 in a direction (indicated by arrow 56 in FIGS. 3 and 4). Movement in this direction is referenced as the "Z" direction herein. By way of example, movement in the Z direction according to the second device 54 is along a substantially straight line, similar to the first device 50. As shown, however, the first device 50 moves the applicator member 32 in a direction that is transverse to the movement of the applicator member 32 by the second device 54. In the embodiment shown, the Z direction is substantially perpendicular to the axis of rotation 24 and the Y direction. Therefore, according to movement by one or the other or both of the first and second devices 50, 54, the applicator member 32 may be moved only in the Y direction, only in the Z direction, or in a combination of the Y and Z directions for positioning the applicator member 32 relative to the surface of the core member 14. As shown, the first device 50 moves the second device 54. In view of the Y and Z directions above and considering a traditional X-Y-Z Cartesian orthogonal coordinate system, the assembly 16, in the embodiment shown, lacks any device capable of movement in the third orthogonal direction or "X" direction.

In one embodiment, the first device 50 is secured along its longitudinal axis to the top plate 46 of the frame 34. This arrangement may improve the rigidity of the assembly 16 and the frame 34. However, should the frame 34 have sufficient rigidity in the absence of the device 50, the reverse arrangement as between the first device 50 and the second device 54 is also contemplated. In this regard, the second device 54 may be secured to the top plate 46 so as to project substantially perpendicularly therefrom. The second device 54 may be the same make and model of commercially available positioner as the first device 50. However, it will be appreciated that embodiments of the invention are not so limited as the first device 50 and the second device 54 need not be the same make and model positioner. For example, the second device 54 may be a HD series linear positioner, such as, the HD125 Series Linear Table, commercially available from Parker-Hannifin in Cleveland, Ohio.

By the first and second devices 50, 54, the applicator member 32 may be moved in a Y-Z plane that intersects the core member 14. However, while two orthogonal axes are utilized, a third device for movement in an "X" direction may not be required. In this sense, the exemplary embodiment of the applicator assembly 16 shown in FIG. 1 is fixed in the X direction by the height as determined by the frame 34. Further in this regard, however, it will be appreciated that other combinations of orthogonal-type axes may be used. By way of example, the applicator assembly 16 may include devices for movement in the X direction and Y direction or in the X direction and the Z direction as an alternative to that described herein, i.e., movement in the Y direction and the Z direction. The difference in directional movement may require relocation of the assembly 16. For example, an assembly which moves the applicator member 32 in the X and Y directions, according to the same coordinate system set out above, may be positioned above the core member 14 such that movement in the X direction is downward toward to the core member 14. Additional axes of movement, for example, rotational axes, may be utilized, where necessary, to change the angular relationship of the applicator member 32 relative to the tire-building surface 15 while the applicator member 32 is being moved in the Y-Z plane. As is set forth in detail below, rotational axis may be used to apply the cord 12 in regions of the core member 14 having reverse curvature.

Figure 5:
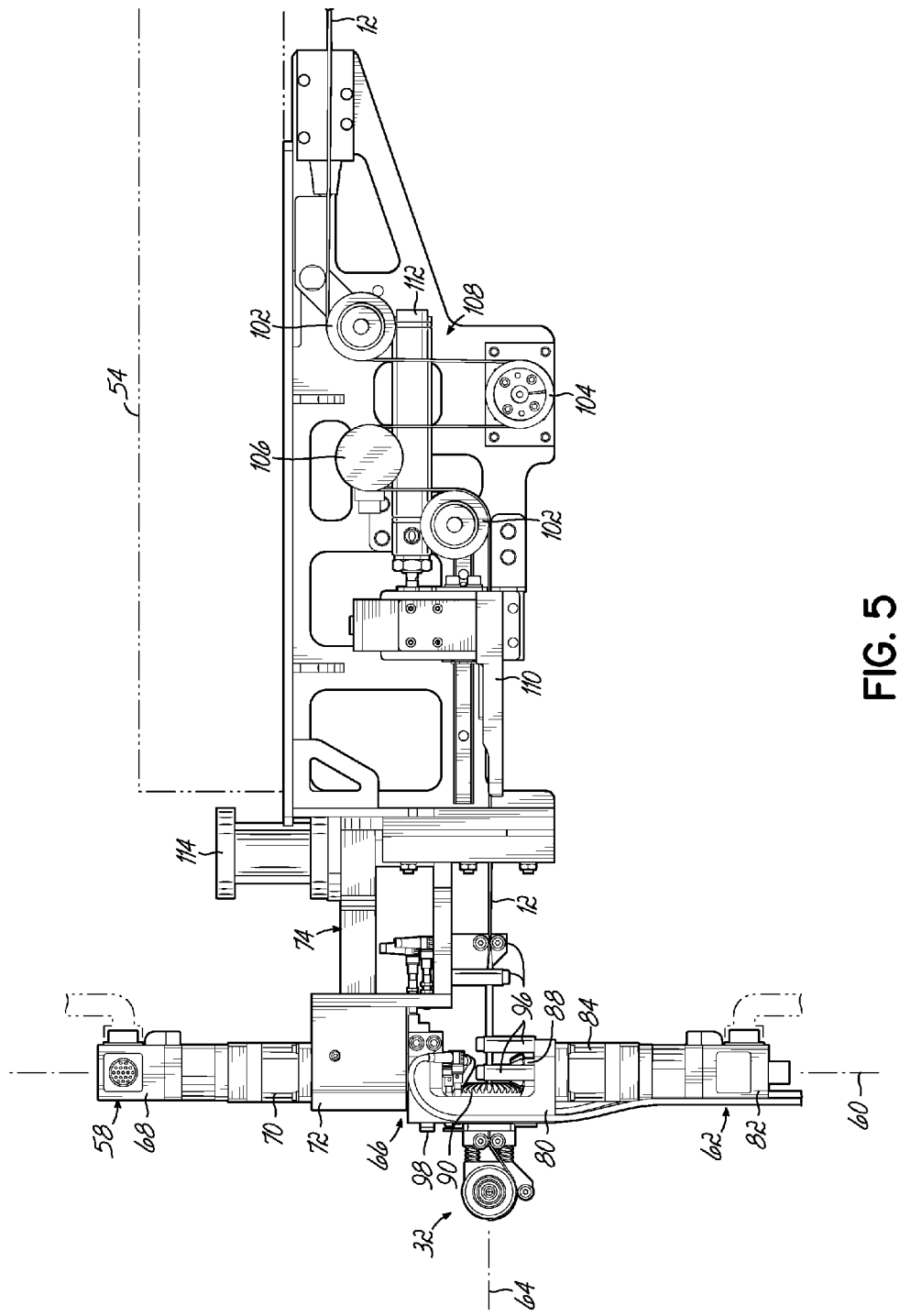
FIG. 5 is a partial side elevation view of the applicator assembly of FIG. 4.

In this regard and with reference to FIGS. 4 and 5, the applicator assembly 16 further includes a first rotary device 58 that is operatively connected to the second device 54 and is capable of rotating the applicator member 32 around a first axis 60. As shown, the axis 60 is substantially perpendicular to each of the Y direction and the Z direction, as indicated by arrows 52 and 56, respectively, in FIG. 4. Accordingly, the first rotary device 58 rotates the applicator member 32 in the Y-Z plane. As referenced herein this rotational motion is referred to as the "pitch" (labeled "φ" in FIG. 4) of the applicator member 32. As will be described in detail below, controlling the pitch of the applicator member 32 allows control of the orientation of the applicator member 32 relative to the surface of the core member 14. The orientation of the applicator member 32 is a factor in developing sufficient pressure to adhere the cord 12 to the core member 14.

In one embodiment, a second rotary device 62 is operatively coupled to the applicator member 32 and is capable of rotating the applicator member 32 about a second axis 64. Rotation about the second axis 64 is referred to herein as the "yaw" of the applicator member 32 (labeled "ψ" in FIG. 4) and is also described in more detail below. In one embodiment, the second axis 64 lies in the Y-Z plane. Furthermore, in one exemplary embodiment, the axis of rotation 24 of the core member 14 (FIG. 1) and the axis 64 are substantially coplanar.

As shown in FIGS. 4 and 5, the first rotary device 58 may be operatively connected to the second rotary device 62 so as to rotate the second rotary device 62 about the axis 60. In the exemplary embodiment, both devices 58 and 62 lie along the axis 60 with the relative rotation between the device 58 and the device 62 occurring at the rotary joint 66, shown in FIG. 5. According to the configuration shown, the first rotary device 58 may move in the Y and Z directions only, i.e., the first rotary device 58 does not itself rotate. As set out briefly above, the combination of the pitch and yaw of the applicator member 32, when the applicator member 32 is in contact with the core member 14, is one factor in properly orienting the applicator member 32 for applying the cord 12 to the core member 14. One exemplary embodiment of the first rotary device 58 and the second rotary device 62 is described below.

Figure 6:
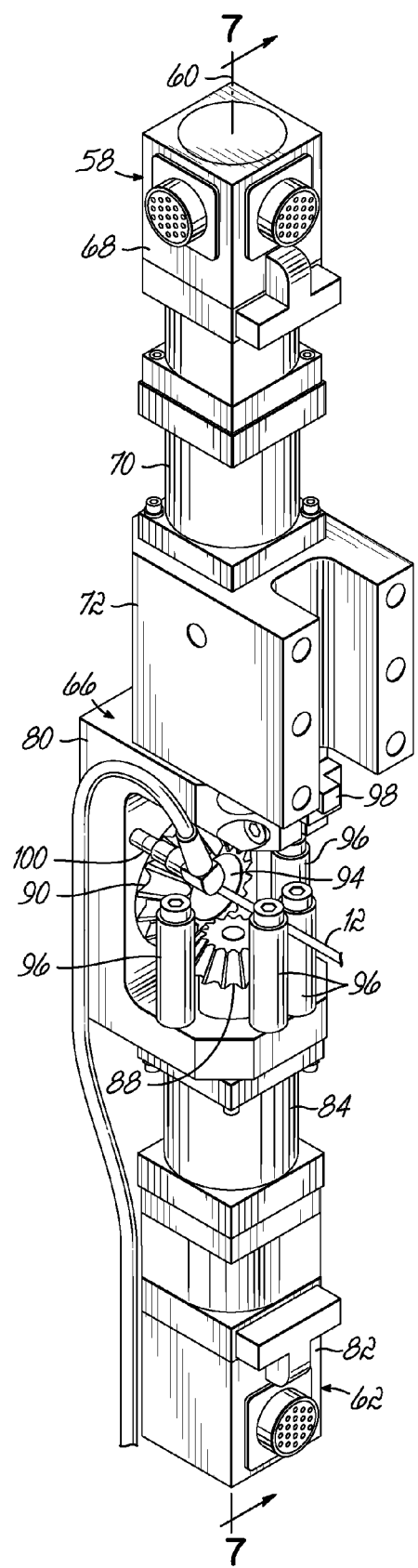
FIG. 6 is a perspective view of a portion of the applicator assembly of FIG. 3.
Figure 7:
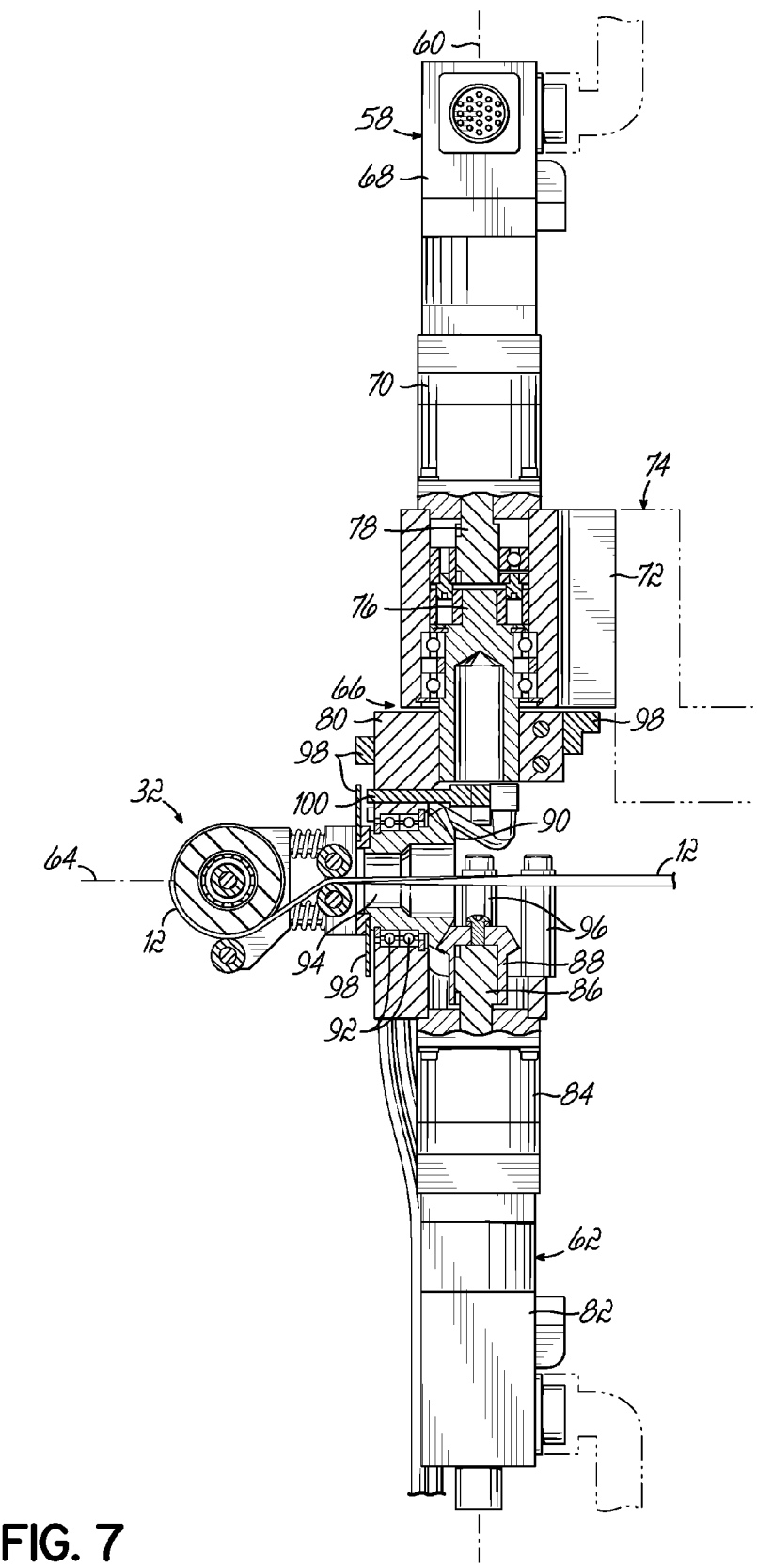
FIG. 7 is a partial cross-sectional view of a portion of the applicator assembly of FIG. 6 taken generally along section line 7-7.

By way of example and with reference to FIGS. 5, 6, and 7, the first rotary device 58 may include a servo motor 68 operatively coupled to a gear reducer 70. The gear reducer 70 may be secured to a housing 72, which is secured to a frame assembly 74 carried by the second device 54, shown best in FIG. 5. With reference specifically to FIG. 7, a stub shaft 76 is operatively coupled with a gear reducer shaft 78 and is rotatable within the housing 72. The stub shaft 76 extends from the housing 72 and is secured to a C-shaped support 80 to which the applicator member 32 and the second rotary device 62 are secured. The stub shaft 76 may be rotatable about the axis 60 with the servo motor 68. The rotary joint 66 may be formed at an interface between the C-shaped support 80 and the housing 72 by the stub shaft 76. Driving the servo motor 68 may thus cause the stub shaft 76 to rotate thereby rotating the second device 62 and the applicator member 32. By activating the servo motor 68, the pitch, as indicated by $\phi$ in FIG. 4, of the applicator member 32 may be changed. In the exemplary embodiment shown, however, the housing 72, the gear reducer 70, and the servo motor 68 do not rotate about the axis 60.

With reference to FIGS. 5, 6, and 7, similar to the first rotary device 58, the second rotary device 62 may include a second servo motor 82 operatively coupled to a second gear reducer 84. The second gear reducer 84 is secured to the C-shaped support 80. In FIG. 7, a second gear reducer shaft 86 extends from the gear reducer 84 and is secured to a pinion gear 88. A bevel gear 90 is rotatably secured in C-shaped support 80 by bearings 92 by which the bevel gear 90 may rotate around the axis 64. The applicator member 32 may be operatively secured to the bevel gear 90. As shown, the axis 64 is oriented substantially perpendicular to the axis 60. In addition, in the exemplary embodiment shown best in FIG. 7, the bevel gear 90 defines an opening 94 through which the cord 12 passes to the applicator member 32. As shown, the cord 12 may be collinear with the axis 64 through at least a portion of the applicator assembly 16 and may depart from that collinear relationship before being applied to the core member 14. The bevel gear 90 may cooperate with the pinion gear 88 such that driving the servo motor 82 rotates the pinion gear 88 which in turn rotates the bevel gear 90, and thus the applicator member 32, about the axis 64. While not being limited thereto, in one embodiment, the rotation of the applicator member 32 may be intentionally limited to prevent damage to the cord 12. This limited range of rotational motion or yaw, $\psi$, may be from about +90° to about −90° or by way of further example from about +45° to about −45° where 0° is defined at the orientation of the applicator member 32 shown in FIG. 3.

As set forth above, in one embodiment, each axis (i.e., Y, Z, pitch, yaw, and spindle) may be servo driven. Controlling and synchronizing servo motion in these five axes may be accomplished with commercially available servo controllers. Although not shown in the figures, five controller/amplifier combinations may be used to independently drive the servo motors. By way of example, each servo, including the spindle, may be controlled by a corresponding Compumotor ACR 9000 controller in combination with an ARIES servo amplifier and variable frequency drive (VFD). These controllers, amplifiers, and VFDs are commercially available from Parker-Hannifin. As shown in FIG. 1, this equipment may be housed in the control enclosure 26 and communicate with a PLC controller or computer (not shown), which coordinates control of each servo motor.

In view of the servo/controller/amplifier combination, in one embodiment, the coordinated movement of the applicator member 32 and the core member 14 may significantly reduce an error in position between the predetermined path and an actual path traced by the applicator member 32 over the surface of the core member 14. In one embodiment, the error is minimal thus allowing actual application of the cord 12 to the core member 14 to closely follow the predetermined path. Advantageously, by way of example, the error in the spindle position, $\Theta$, may be less than about +/−0.2° or less than about +/−0.15°. The error in the Y and Z positions may be less than about +/−1 mm or less than about +/−0.9 mm. The error in pitch, $\phi$, may be less than about +/−1° or less than about +/−0.5°. The error in yaw, $\psi$, may be less than about +/−5° or less than about +/−2.5°. As a result of the orientation of at least the devices 50 and 54, the error in these positions does not stack-up as is observed in off-the-shelf six-axis robots. In one embodiment the error between the predetermined path and the actual path may be on the order of about a few millimeters (e.g., less than 5 mm). For example, the error may be less than about 2 mm and in a further example, the error may be less than about 1 mm. The degree of error may vary over the surface of the core member 14. This accuracy may be achieved because of the stiffness (i.e., both static and dynamic) associated with each of the headstock unit 22, the applicator assembly 16, and the frame 34. By way of example, the stiffness of the frame 34 and applicator assembly 16 may be on the order of about 30 N/μm and by way of further example may be on the order of about 3 N/μm or less.

Furthermore, accuracy may be improved by slowing down the winding process, the system 10 may achieve the above-mentioned accuracy at a winding velocity of from about 2.5 m/sec to about 30 m/sec. The winding velocity is measured as the length of the cord 12 applied to the surface of the core member 14 per second. In one embodiment, four assemblies similar to assembly 16 are simultaneously utilized to each wind a cord on the core member 14. With four assemblies, the above-mentioned accuracy may therefore be achieved at a winding velocity about 2.5 m/sec, and, depending on the configuration of the cord 12, the accuracy may be achieved at a winding velocity of about 7.5 m/sec. Accordingly, depending on the size of the resulting tire, the predetermined pattern, and the size of the cord, the winding process to apply the applied layer may be less than one hour. By way of example, the winding process may be complete, that is, the applied layer 170 may be completed in less than about 50 minutes; by way of further example, less than about 25 minutes; and by way of additional example, less than about 5 minutes.

As set forth above, the system 10 is configured to apply the cord 12 to the toroidal-like surface along a predetermined path as a part of a predetermined pattern. To do so, the applicator assembly 16 moves the applicator member 32 in the Y direction, in the Z direction, in pitch, and/or in yaw, as set forth above, to position the applicator member 32 relative to the core member 14 to follow the predetermined path. In this regard, the system 10 may be further configured to coordinate or synchronize movement of the applicator member 32 with rotation of the spindle angular position Θ to apply the cord 12. Coordination of movement may result in forcing the cord 12 into contact with the core member 14. The magnitude of the force may be sufficient to cause the cord 12 to stick or temporarily adhere to the tire-building surface 15.

Figure 8A:
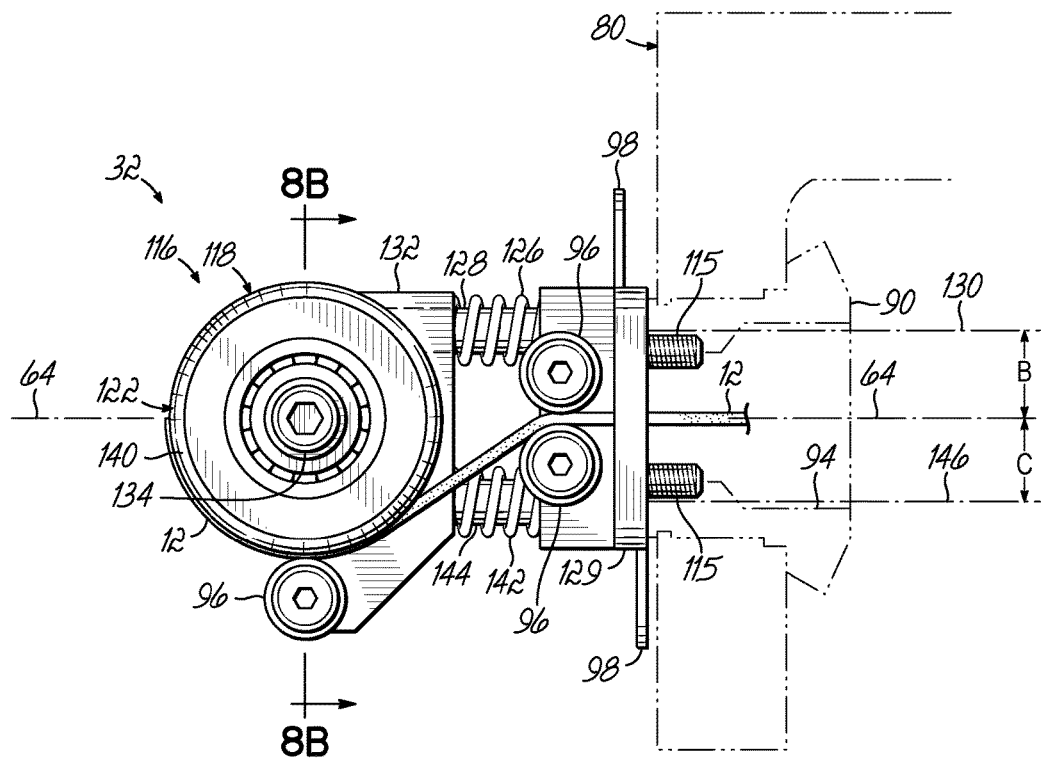
FIGS. 8A, 8B, and 8C are side elevation, cross-sectional, and plan views, respectively, of one embodiment of an applicator member according to one embodiment of the invention.
Figure 8B:
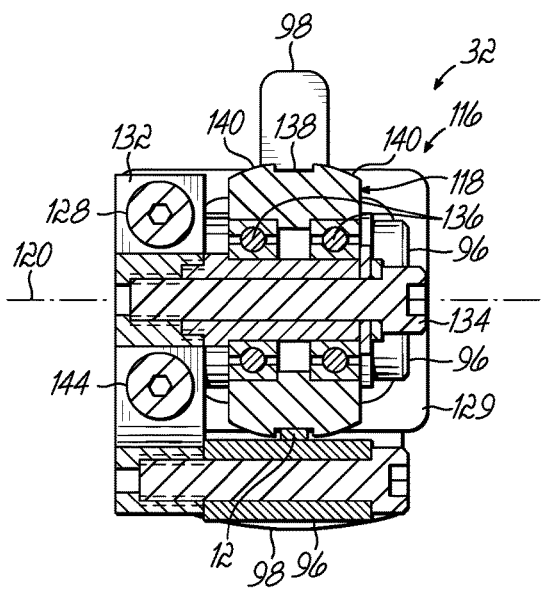
Figure 8C:
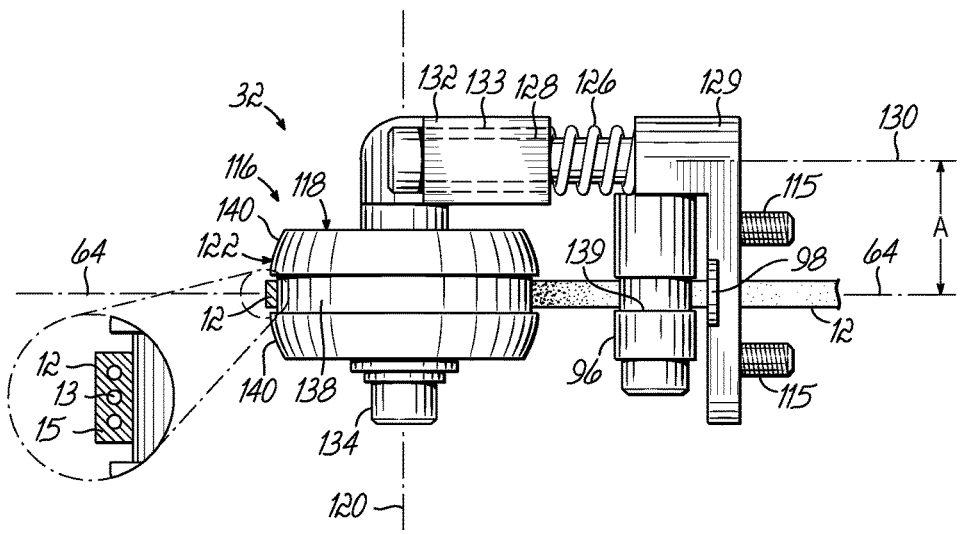
Figure 10:
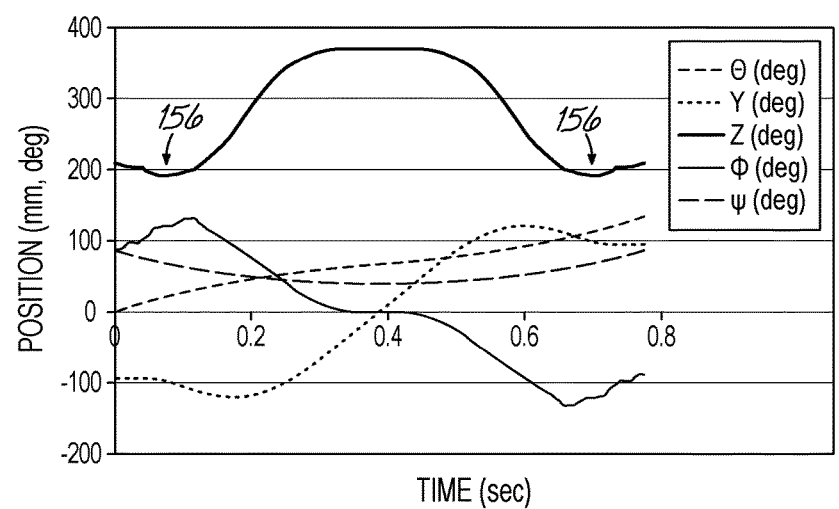
FIG. 10 is a graphical representation of various axis positions for moving an applicator assembly across a surface of a core member.

To this end and with reference to FIGS. 8A-8C, in one embodiment, the applicator member 32 may be secured to the bevel gear 90, as set out above, by screws 115 and may include a mechanism 116 by which pressure between the cord 12 and the core member 14 may be controlled. The mechanism 116 may also advantageously allow some error between a desired location and orientation and the actual location and orientation of the applicator member 32 as the applicator member 32 follows the predetermined path without degradation of the cord 12 or damage to the cord already applied to the core member 14. Accordingly, the mechanism 116 may allow some positioning error due to any inaccuracies in one or more of the Y direction, Z direction, pitch, and/or yaw in the applicator assembly 16. So, while the accuracy of each axis may be sufficient to allow the applicator assembly 16 to track the toroidal-like surface of the core member 14 according to the predetermined path, the mechanism 116 takes up any unintended slack or error in position without degradation of the cord 12 or damaging any already applied cord 12. One embodiment of this mechanism is described in detail below.

In one embodiment, the mechanism 116 may include a roller 118 that rotates about a roller axis 120 (shown best in FIGS. 8B and 8C) and defines an application surface 122 for applying the cord 12 to the toroidal-like surface. The application surface 122 may be metallic, such as, aluminum, or be a softer material, such as, polyurethane (e.g. about 50 durometer), which may be in the configuration of a cover (not shown) that is wrapped around a metallic core (not shown). It is noted that softer materials may provide additional tact between the roller 118 and the cord 12 so that the cord 12 does not fall off the roller 118 between winding processes. In the exemplary embodiment shown, the roller axis 120 is coplanar with the second axis 64 about which the second rotary device 62 rotates the applicator member 32. In this regard, driving the second rotary device 62 rotates or changes the yaw of the roller 118 and roller axis 120 with respect to axis 64. The roller axis 120 may therefore depart or project from the Y-Z plane as the yaw of the applicator member 32 changes. As is also shown, the second axis 64 may coincide with the cord 12 as it is transferred to the roller 118. By way of example and not limitation, the roller 118 may be dimensioned to cooperate with all possible orientations and curvatures of the core member 14. In particular, this may include portions of the core member 14 that are characterized by a reversed curvature. That is, rather than being a convex surface, portions of the surface are concave. As is known in the art, reverse curvature may be observed in a cross section of a tire between the bead and the sidewall thereof. Accordingly, core members according to embodiments of the present invention may include reverse curvature, particularly in applications where the toroidal-like surface of the core member 14 substantially defines the inner surface of the resulting tire. In this regard, the diameter of the roller 118 may range from about 25 mm to about 75 mm.

In one embodiment, the diameter of the roller 118 is between about 25 mm and about 50 mm.

In addition, in one embodiment, the roller 118 may have a groove 138 in its outer annular surface for receiving the cord 12, as shown. The groove 138 may be configured to stabilize tracking of the cord 12 along the roller 118 as the cord 12 is applied to the core member 14. The configuration of the groove 138 may depend on the configuration of the cord 12. In this regard, the width of the groove 138 may be greater than the cross-sectional width of the cord 12, though the depth of the groove 138 may be less than the cross-sectional height of the cord 12. As shown, this configuration results in exposure of a portion of the cord 12 above the surface of the roller 118. It will be appreciated that this exposes the cord 12 at the application surface 122 between the roller 118 and the core member 14, as is shown best in FIG. 8A. Furthermore, the roller 118 may include beveled or curved edge portions 140 so that, even if the roller 118 includes the groove 138, the roller 118 may not contact the core member 14. Rather, the cord 12 may separate the roller 118 from the core member 14. In one embodiment, one or more of the rollers 96 may include a groove 139, shown in FIG. 8C. The groove 139 in roller 96 may be in addition or an alternative to the groove 138 in the roller 118. However, where the roller 96 includes the groove 139, the roller 118 may have a smooth application surface 122 though the distance between the smooth application surface 122 to the bottom of the groove 139 may be less than the cross-sectional thickness of the cord 12 to slightly compress the cord 12 onto the roller 118.

In further regard to the mechanism 116 and with reference to FIGS. 8A-8C, the mechanism 116 may include a resilient member, such as, a spring 126, positioned between, for example, the application surface 122 and the device 54 (FIG. 5) that generally defines movement in the Z direction. By way of additional example, the spring 126 may be positioned between the application surface 122 and the axis 60. The force axis of the spring 126 may be aligned substantially parallel with the axis 64 and thus be compressible substantially parallel to the axis 64. As such, movement along any single one of the Y direction and/or the Z direction or about the axis 60 to adjust the pitch of the applicator member 32 may change the compression of the spring 126. While characteristics of the spring 126 may depend on the nature of the cord 12, an exemplary spring according to one embodiment of the invention may be characterized by a stiffness from about 0.5 N/mm to about 10 N/mm and by way of further example, from about 3 N/mm to about 6 N/mm. The compressed, solid length of an exemplary spring, for example, may be between about 3 mm and about 30 mm and by way of further example, between about 5 mm and about 15 mm. When the roller 118 is not in use, the spring 126 may have an uncompressed length of from about 6 mm to about 50 mm, from about 10 mm to about 25 mm, and by way of further example, from about 10 to about 15 mm.

As shown in FIGS. 8A and 8C, the mechanism 116 may further include a guide member or bushing 128 around which the spring 126 is positioned. The bushing 128 may be secured to a plate 129 so as to guide the spring 126 along a compression axis 130 during compression and relaxation thereby substantially maintaining the application surface 122 in proper alignment with the axis 64. As shown, the bushing 128 extends through a guide block 132. When the roller 118 is sufficiently forced against the core member 14, the guide block 132 slides generally parallel to the axis 64 along the bushing 128 and compresses the spring 126. The guide block 132 may be made of bronze. To further ease sliding of the block 132 along the bushing 128, a linear bearing 133 may be interposed between the block 132 and bushing 128. The bearing 133 may reduce friction between the block 132 and the bushing 128 so as to allow the roller 118 to be more accurately positioned during the winding process.

As shown in FIG. 8B, the roller 118 is rotatably secured to the guide block 132 by a cap screw 134 and a plurality of bearings 136 such that the roller 118 rotates freely. Guide roller 96 may be rotatably secured to the guide block 132 and the plate 129. The guide roller 96 may be spaced from the roller 118 by a distance less than the cross-sectional height of the cord 12. The cord 12 may therefore be initially slightly compressed onto the roller 118 by the guide roller 96 secured to the guide block 132, as set forth above. It will be appreciated that additional guide rollers 96 may be rotatably secured to the guide block 132 at other locations to facilitate placement of the cord 12 on the roller 18. While the dimensions of the applicator member 32 may vary depending on the dimensions of the core member 14, in one embodiment, the dimension from the plate 129 to the roller axis 120 may be in a range from about 25 mm to about 250 mm, and, by way of further example, may be in range from about 25 mm to about 125 mm.

As shown in FIG. 8C, the axis 130 may be offset from or be non-collinear with the axis 64. However, although not shown, the axis 130 may be coplanar with each of the axis 64 and the axis 120. By way of example, the offset (labeled A in FIG. 8C) may be a distance of about 12 mm to about 50 mm and, by way of further example, the offset may be a distance of about 12 mm to about 35 mm.

As shown in FIG. 8A, in one embodiment, the mechanism 116 may further include a second resilient member, such as, a second spring 142, in cooperation with a guide member or bushing 144 that defines a second compression axis 146. As with the spring 126, the spring 142 may be compressed during application of the cord 12 to the core member 14. In one embodiment, the spring 142 has similar characteristics as the spring 126, set forth above. It will be appreciated that while springs are described herein, the mechanism 116 may include other devices which may provide a similar function as the springs disclosed. By way of example, an air bag, counterweight, or compressible cylinder, may provide the requisite compliance in the applicator assembly 16. Furthermore, as with the axis 130, the compression axis 146 may be offset from the axis 64 by the distance A. In this regard, the axis 146 may be non-collinear with the axis 130.

In addition to the offset A shown in FIG. 8C, in one embodiment, each of the axes 130, 146 is offset in opposing directions from the axis 64. For example, in the embodiment shown, each axis 130 and 146 is offset from a plane that includes the axes 64 and 120 by a distance B and C, respectively (shown best in FIG. 8A). The distances B and/or C may, for example, be minimal to allow clearance between the spring 126 and the spring 142 to a distance of about 50 mm and by way of further example to a distance of about 40 mm.

With this configuration, and in one embodiment, one or more additional guide rollers 96 may be positioned on the plate 129 to contact the cord 12 to maintain alignment between the cord 12 and the opening 94. While the guide rollers 96 may be located in a variety of positions, they may be positioned to prevent unintentional contact between the cord 12 and other portions of the applicator assembly 16. Rotation of the applicator member 32 about either or both of the axes 60 and 64 (i.e., pitch and yaw) may result in contact between the cord 12 and the guide rollers 96, but not between the cord 12 and other portions of the applicator member 32, at least not to the extent that the cord 12 is damaged.

Because the cord 12 is supplied in a continuous strand, it may be necessary to properly tension the cord 12 prior to applying it to the core member 14. By tensioning the cord 12, or by removing any slack in the cord 12, the uniformity of the resulting applied layer may be improved. In this regard and with reference to FIG. 5, in one embodiment of the invention, the cord 12 may be tensioned prior to being aligned with the opening 94. By way of example, the frame assembly 74 may carry additional guide rollers 96 to align or guide the cord 12 with the opening 94. As shown, the guide rollers 96 may be oriented both horizontally and vertically. In addition, a plurality of idle rollers 102, a pull roller 104, and a tension adjust roller 106 may form a festoon 108 to reduce or remove slack or to properly tension the cord 12, particularly when the cord 12 is supplied by a letoff unit, before the cord 12 is supplied to the applicator member 32. A clamp assembly or guide tube 110 may be adjusted by cylinder 112 to pass the cord 12 through a clamping device 114 prior to passing between guide rollers 96 and entering the opening 94.

With reference to FIGS. 6 and 7, and 8A-8C, the assembly 16 may further include a plurality of prox targets or flags 98 and prox switches 100 to provide the system 10 with an indication as to when a limit of pitch or yaw movement may be reached to prohibit damage to the cord 12 or to the assembly 16. In this regard, the second rotary device 62 may be configured to rotate the applicator member 32 over a limited range of yaw as set forth above. Furthermore, by way of example, the first rotary device 58 may be configured to rotate the applicator member 32 over a limited range of pitch, $\phi$, from about +150° to about −150° where 0° is shown in FIG. 3 or where the axis 64 is substantially aligned in the Z direction.

As set forth above, the applicator member 32 is oriented by each of the devices 50, 54, 58, and/or 62 to position it relative to the toroidal-like surface of the core member 14 during a cord winding process. With reference to FIG. 3, the orientation of the applicator member 32 is predetermined in anticipation of a predetermined path of the cord 12. The predetermined path also depends on the spindle angular position, $\Theta$, of the core member 14. Accordingly, each of the Y, Z, $\phi$, $\psi$, and $\Theta$ are coordinated, for example, by a PLC controller, to apply the cord 12 in a predetermined path on the core member 14. An example of such coordinated movement is described next.

With reference to FIGS. 3 and 9A-9D, the movement of the applicator assembly 16 and the core member 14 are coordinated to apply the cord 12 to the core member 14 in a predetermined pattern and results in an applied layer 170 of the cord 12 in an actual pattern 150 on the core member 14. As set forth above, the applied layer 170 forms at least a portion of a carcass for use in the manufacturing of a pneumatic tire. In one embodiment, the actual pattern 150 may result in a geodesic pattern of cord in the resulting tire.

Figure 9A:
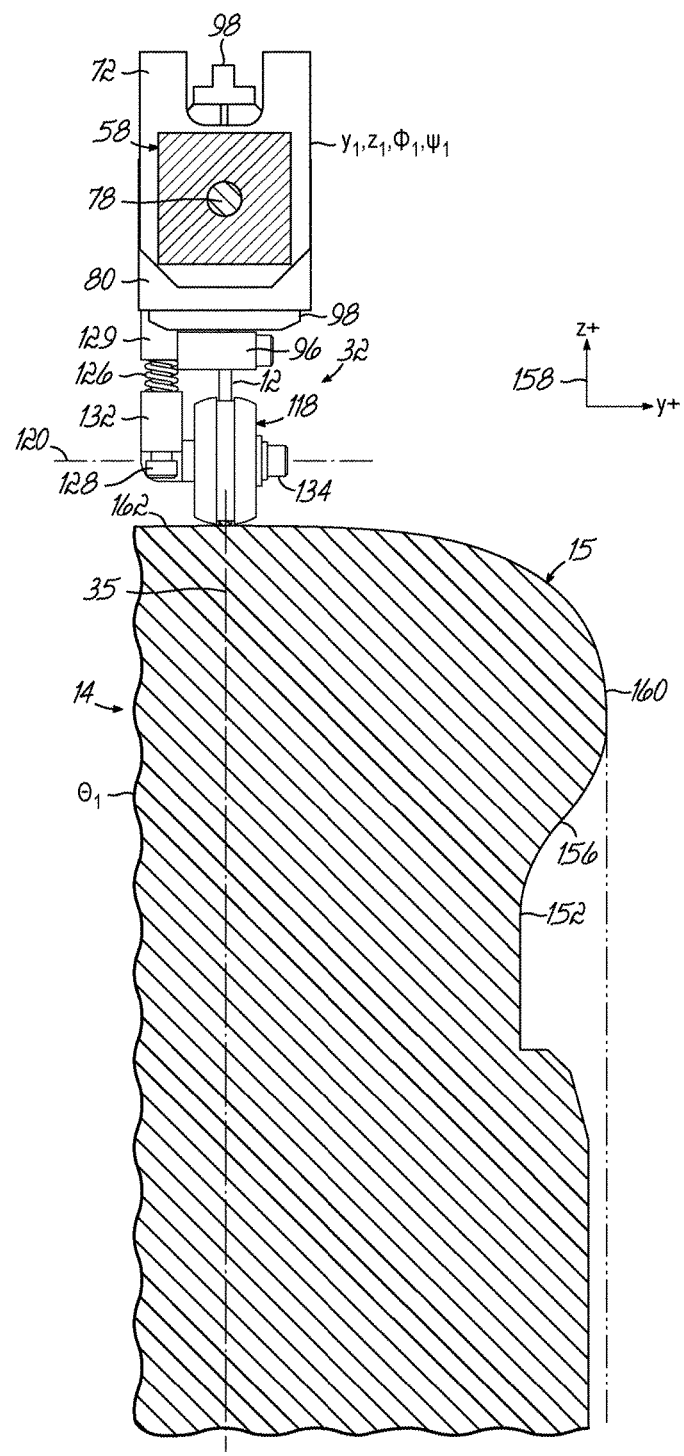
FIG. 9A is a partial cross-sectional plan view of a portion of the applicator assembly in contact with the core member according to one embodiment of the invention.

With reference to FIGS. 3 and 9A, in one embodiment of a winding process, a predetermined pattern may require the actual pattern 150 to begin at or near a crown region 162 of the core member 14. It will be appreciated that the crown region 162 may be configured to define the inner surface of the resulting tire near the tread. The starting location at the crown region 162 is merely exemplary, though it may be advantageous to being in the crown region 162. For example, starting at the crown region 162 may reduce or minimize any departure from uniformity in the resulting tire. It will be appreciated that other starting points may be advantageous depending on the type of tire being manufactured.

As shown in FIGS. 3 and 9A, the applicator member 32 may be brought into contact with the core member 14 in the crown region 162 while the core member 14 is stationary or alternatively while the core member 14 is rotating. This movement may be achieved by controlling (1) the device 50 to move the applicator member 32 in the Y direction to a position $Y_1$, (2) the device 54 to move the applicator member 32 in the Z direction to a position $Z_1$, (3) the device 58 to move the pitch of the applicator member 32 to an orientation $\phi_1$, and/or (4) the device 62 to move the yaw of the applicator member 32 to an orientation $\psi_1$, while the spindle orientation at this location is $\Theta_1$, as is indicated in FIG. 9A. At this coordinated position, each of $Y_1$, $Z_1$, and $\phi_1$ may result in compression of the spring 126 and the spring 142 (not shown). It will be appreciated that all movements may occur in a particular order or may occur substantially simultaneously. By this movement, the cord 12 may be initially applied to the core member 14 and stick thereto in the crown region 162. To ease description, the movement in the Y and Z directions will be described with reference to a Y-Z coordinate axis 158.

Figure 9B:
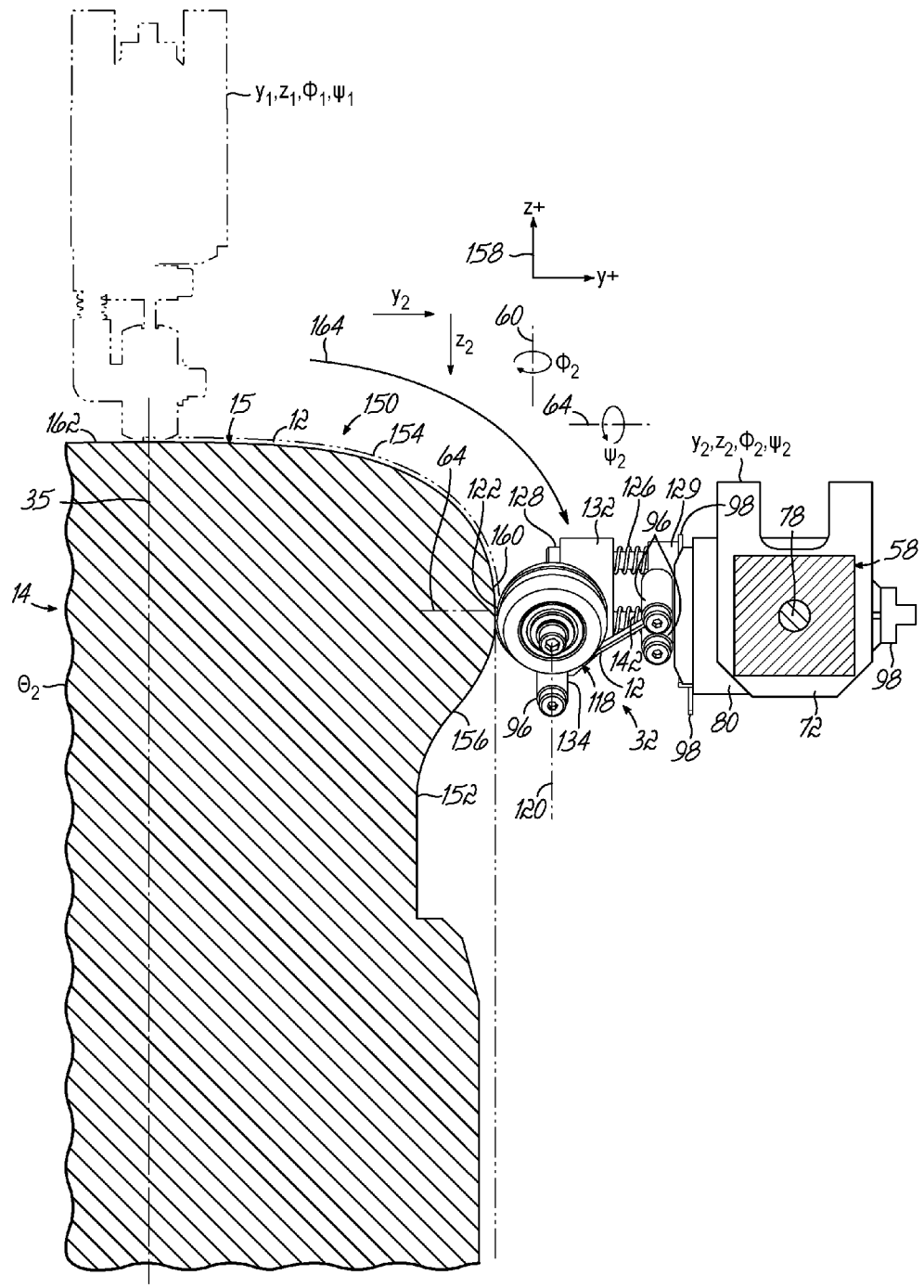
FIG. 9B is a partial cross-sectional plan view of a portion of the applicator assembly in contact with the core member following application of the cord shown in FIG. 9A.
Figure 9C:
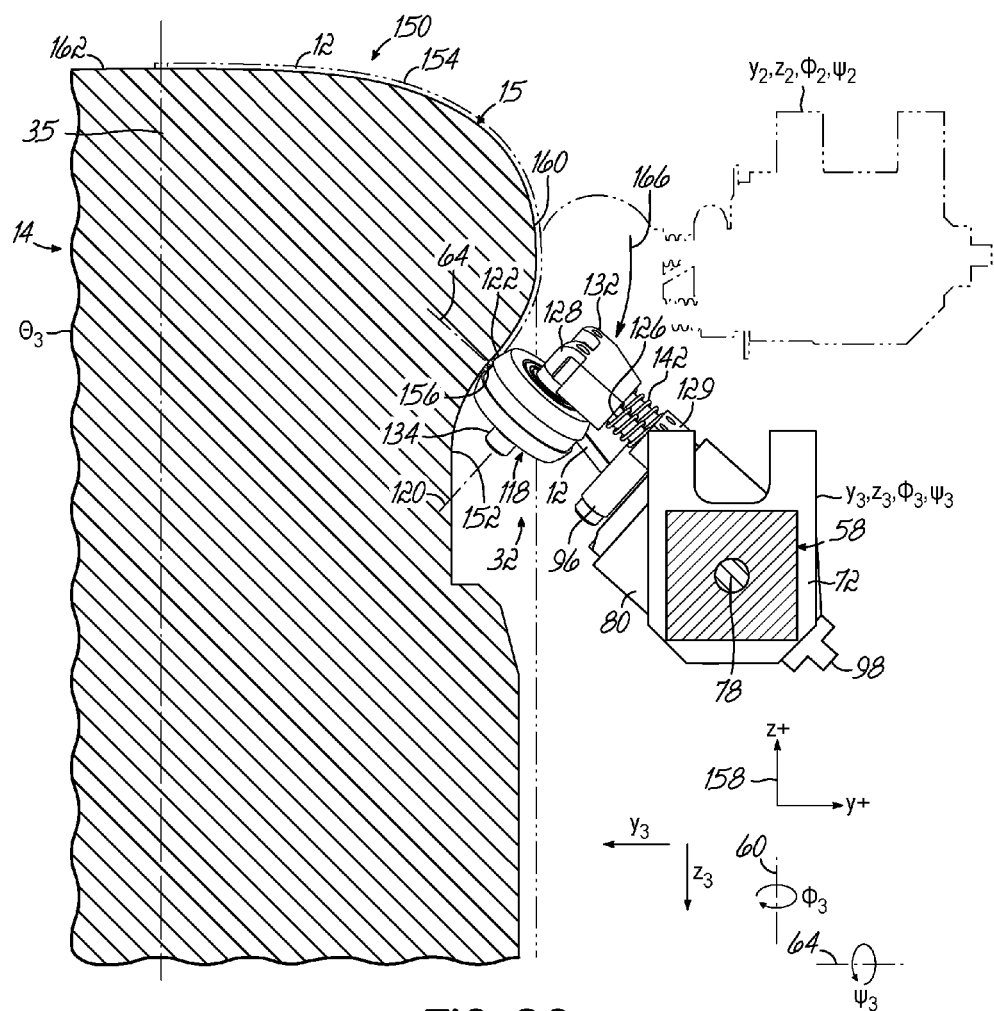
FIG. 9C is a partial cross-sectional plan view of a portion of the applicator assembly in contact with the core member following application of the cord shown in FIG. 9B.

As shown in FIG. 9B, further rotation of the core member 14 about the axis of rotation 24 applies an initial portion 154 of the actual pattern 150 to the core member 14. By way of example, the initial portion 154 may be oriented in a radial direction toward the region 160 of the core member 14. In particular, as the headstock unit 22 rotates the core member 14, the orientation of one or more of Y, Z, $\phi$, and/or $\psi$ that determine the position of the applicator member 32 and the rate of change of $\Theta$ may be adjusted according to the predetermined pattern. It will be appreciated that the motion of each of the headstock unit 22 and devices 50, 54, 58, and 62 may be substantially smooth so as to keep the motion of core member 14 and the applicator member 32, respectively, uniform and continuous. The initial portion 154 of the actual pattern 150 may therefore follow the cord path defined by the predetermined pattern.

Specifically, by way of example, upon further rotation of the core member 14 about the axis of rotation 24, the devices 50, 54, 58, and 62 may smoothly transition through multiple individual values of Y, Z, $\phi$, and/or $\psi$ to arrive at and smoothly pass through a coordinated position defined by $Y_2$, $Z_2$, $\phi_2$, $\psi_2$ at $\Theta_2$ in region 160. This general path is indicated by arrow 164. As shown in FIG. 9B, the region 160 may define a sidewall region of the resulting tire. To arrive at this position from the previous position, the applicator member 32 may be moved in the positive Y direction and the negative Z direction as indicated by the Y-Z coordinate axis 158 from the previous position. That is, the values of Y may generally increase from the position of the applicator member 32 at the crown region 162 to the sidewall region 160, but the values of Z may generally decrease during this same movement. The pitch of the applicator member 32 may be increased from $\phi_1$ to $\phi_2$. This may include increasing the pitch to about 90° in the sidewall region 160. The yaw may be increased or deviate from 0° at $\psi_1$. The roller axis 120 may therefore depart from the Y-Z plane as the roller 118 tilts in the Y-Z plane. The direct orientation, rather than a passive reorientation, of the roller 118 may improve the uniformity of the cord 12 applied to the core member 14. The pattern 150 in this region may, therefore, be gradually directed radially toward a bead region 152 which is configured to define a corresponding bead region of the resulting tire.

Furthermore, as the values of Z change (in this case they decrease), the rotation rate of the spindle may be increased, that is, the angular velocity may be increased. It may be desirable to increase the angular velocity of the core member 14 to offset a decrease in surface velocity that would otherwise be observed at radial positions less than $Z_1$ where the angular velocity is held constant. In one embodiment, in this way the angular velocity of the core member 14 may be varied to maintain a substantially constant linear surface velocity at the contact location between the core member 14 and the application surface 122. It will be appreciated that the angular velocity variation will depend on the type of tire being made. Generally as the section height of the tire increases, the variation in angular velocity needed to maintain the linear surface velocity will also increase. In this regard, the movements of each of the devices 50, 54, 58, and 62 may depend on $\Theta$. In other words, in one embodiment, these devices may be slaved to the angular position, $\Theta$, of the core member 14.

Furthermore, it may be desirable to adjust the pitch of the applicator member 32 to maintain a substantially perpendicular orientation between the axis 64 of the applicator member 32 and the surface of the core member 14 at the application surface 122. Maintaining a substantially perpendicular orientation may improve the consistency of the pressure of the roller 118 against the cord 12 and the core member 14, particularly in regions of reverse curvature. In addition or alternatively, it may be desirable to adjust the yaw in synchronization with the headstock unit 22 position to maintain the roller axis 120 substantially perpendicular to the desired path of the cord 12.

With additional rotation of the core member 14 around the axis of rotation 24, the applicator member 32 is smoothly moved from $Y_2$, $Z_2$, $\phi_2$, and $\psi_2$ at $\Theta_2$ to a reverse curvature region 156 (as indicated by the arrow 166). By way of example, the devices 50, 54, 58, and 62 move the applicator member 32 along the surface of the core member 14 to a coordinated position defined by $Y_3$, $Z_3$, $\phi_3$, and $\psi_3$ at $\Theta_3$. This may include, for example, further moving the applicator member 32 in the negative Z direction and the negative Y direction from the position shown in FIG. 9B. The pitch of the applicator member 32 may be further increased from $\phi_2$ and may approach 150° and the yaw may be further increased, further directing the roller axis 120 at a larger angle from the Y-Z plane. Thus, the roller 118 tilts to orient the cord 12 toward a more radial direction in the reverse curvature region 156. In addition, the spindle may further slow the angular velocity.

Figure 9D:
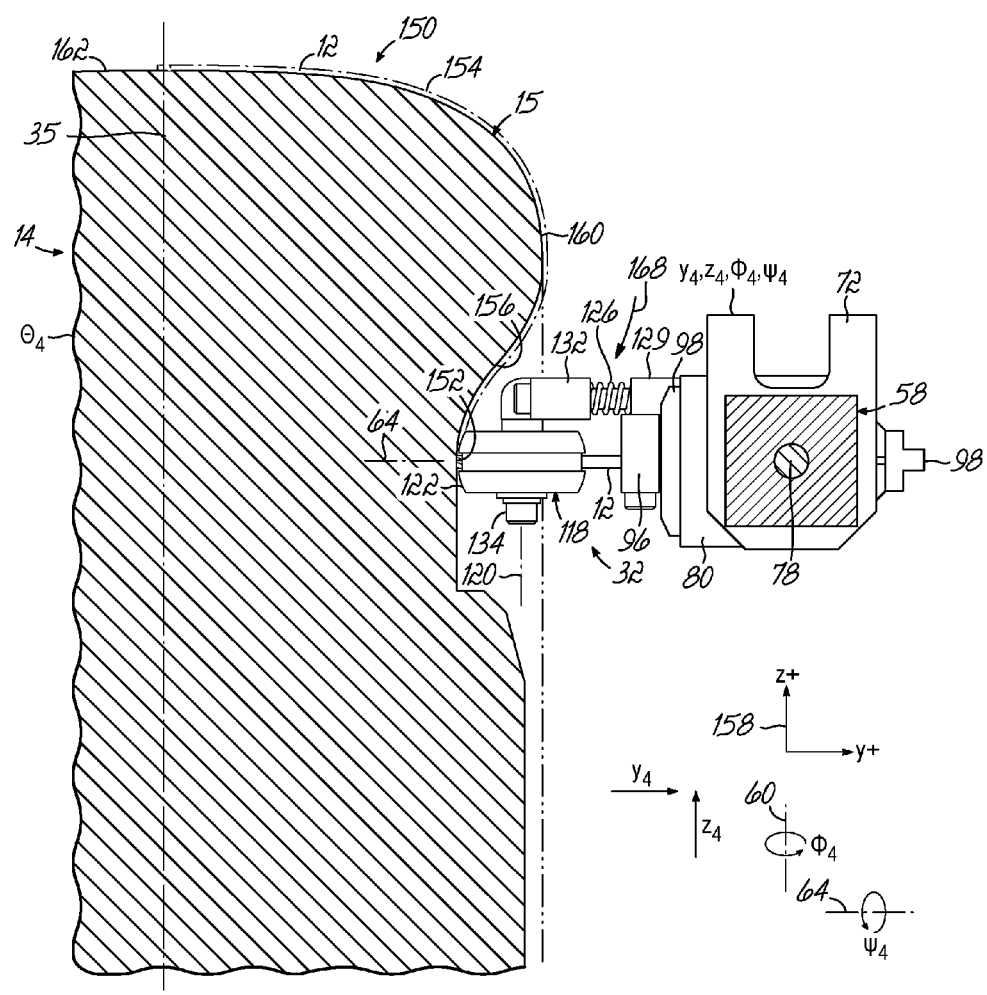
FIG. 9D is a partial cross-sectional plan view of a portion of the applicator assembly in contact with the core member following application of the cord shown in FIG. 9C.

With reference to FIG. 9D, with yet additional rotation of the core member 14 around the axis of rotation 24, the applicator member 32 is moved along the surface of the core member 14 as indicated by arrow 168 to the bead region 152 of the core member 14. It will be appreciated that while the bead region 152 of a corresponding tire may be traditionally associated with a bead, the resulting tire incorporating the applied layer 170 according to embodiments described herein may not require or use a bead as that structure is known in the art. The devices 50, 54, 58, and 62 may move the applicator member 32 to $Y_4$, $Z_4$, $\phi_4$, and $\psi_4$ at $\Theta_4$. This may require movement in the positive Z and Y directions. The pitch of the applicator member 32 may be reduced from $\phi_3$ and approach 90°. However, the yaw may further increase from ψ₃ to orient the cord 12 in a nearly tangential relationship with the radius of the core member 14 in the bead region 152.

During additional rotation (not shown), the cord 12 may be applied to the core member 14 by varying one or more of Y, Z, ϕ, ψ at a given Θ according to the predetermined pattern. By way of example, in FIG. 10, a graphical representation of a predetermined pattern is provided that illustrates profiles of Y, Z, ϕ, ψ, and Θ as a function of time for application of the cord 12 with the applicator member 32 from the bead region 152 to an opposing bead region on an exemplary core member. As set forth above, at any given time along the "Time" axis each of the devices 50, 54, 58, and 62 and headstock unit 22 move to their corresponding position to establish a coordinated position of Y, Z, ϕ, ψ, and Θ.

As is most easily recognized on the Z profile, the core member 14 includes reverse curvature in the region 156. Advantageously, the system 10 according to the embodiments of the invention is capable of successfully applying the cord 12 to the regions of reverse curvature, such as, the region 156, in a commercially reasonable amount of time. It will be appreciated that each of these profiles may change significantly depending on the tire to be manufactured. For example, for a tire with a larger section height, the Z profile may be characterized by a greater difference between the minimum Z value and the maximum Z value, that is, the range of Z values may be greater. The remaining profiles of X, ϕ, an ψ may include similar variations.

With reference to FIGS. 11A and 11B, 12A and 12B, and 13A and 13B, the initial portion 154 of the actual pattern 150 is shown in FIGS. 11A and 11B and generally corresponds to the positions described above and shown in FIGS. 9A-9D. The actual pattern 150 shown is exemplary and in no way limits the embodiments of the present invention disclosed herein. As shown in FIGS. 12A and 12B, after further rotation of the core member 14 to around 680°, that is, nearly 2 complete revolutions, the pattern 150 is further developed. And, with reference to FIGS. 13A and 13B, continued winding of the cord 12 on the core member 14 further develops the actual pattern 150 thereby further covering the toroidal-like surface of the core member 14. As shown, the cords 12 in each successive revolution at some point begin to track side-by-side, in which case the position of each cord 12 gradually shifts to prevent the cord 12 in a revolution from exactly overlapping the previously applied cord 12 in the prior revolution. With this exemplary methodology and continued winding, the actual pattern 150 may eventually cover nearly the entire surface of the core member 14 with the cord 12 in the applied layer 170 (FIG. 3). The actual pattern 150 of the cord 12 may be substantially the same as the predetermined pattern.

The applied layer 170 may form at least a portion of the carcass of a resulting tire. In subsequent manufacturing processes, additional components, such as, a belt-and-tread package (not shown), are added to the carcass to form a green tire. A pneumatic tire including the applied layer 170 is formed following curing of the green tire. In one embodiment, the actual pattern 150 results in a geodesic cord pattern in the resulting tire.

While the present invention has been illustrated by the description of one or more embodiments thereof, and while the embodiments have been described in considerable detail, they are not intended to restrict or in any way limit the scope of the appended claims to such detail. Additional advantage and modifications will readily appear to those skilled in the art. The invention in its broader aspects is therefore not limited to the specific details, representative methods and illustrative examples shown and described. Accordingly, departures may be made from such details without departing from the scope or spirit of Applicants' general inventive concept.

What is claimed is:

1. An applicator assembly for applying a cord to a tire-building surface configured to rotate about an axis during tire construction, the applicator assembly comprising:
    an applicator member with an application surface configured to apply the cord to the tire-building surface;
    a first motor that is operatively coupled to the applicator member and is configured to rotate the applicator member about a first axis relative to the tire-building surface, the cord being collinear with the first axis through at least a portion of the applicator assembly;
    a first linear positioner that is operatively coupled to the applicator member, the first linear positioner configured to move the applicator member in a first linear path relative to the tire-building surface;
    a second motor that is operatively coupled to the applicator member and the first motor, the second motor being configured to rotate the applicator member and the first motor about a second axis that is perpendicular to the first axis, the first motor and the second motor lying along the second axis; and
    a second linear positioner operatively coupled to the applicator member and configured to move the applicator member in a second linear path perpendicular to the first linear path.

2. The applicator assembly of claim 1 wherein the applicator member is a roller and is configured to rotate about a roller axis that is oriented perpendicular to the first axis.

3. The applicator assembly of claim 1 further comprising:
    a resilient member that is operatively coupled to the applicator member and is configured to compress when the applicator member applies the cord to the tire-building surface.

4. The applicator assembly of claim 3 wherein the resilient member is compressible along a third axis that is parallel to the first axis.

5. The applicator assembly of claim 1 wherein the applicator member is a roller and is configured to rotate about a roller axis that is oriented perpendicular to the first axis and further comprising:
    two resilient members that are each operatively coupled to the applicator member, each resilient member being configured to compress when the applicator member applies the cord to the tire-building surface, wherein the resilient members are in a non-collinear relationship with the first axis.

6. The applicator assembly of claim 1 wherein the first motor is configured to rotate the applicator member over a limited range of less than or equal to 180°.

7. The applicator assembly of claim 1 further including a guide roller that is operatively coupled to the applicator member and is configured to align the cord to be collinear with the first axis before the cord contacts the application surface.

8. The applicator assembly of claim 1 wherein the first motor includes a first shaft and the second motor includes a second shaft that defines the second axis and the first shaft is collinear with the second axis.

9. The applicator assembly of claim 8 wherein the first shaft is perpendicular to the first axis.

10. The applicator assembly of claim 1 wherein the applicator member is operatively coupled to a bevel gear defining an opening and the cord is configured to extend through the opening prior to contact with the applicator member.

11. The applicator assembly of claim 1 wherein the second linear positioner is configured to move the first linear positioner and the second motor along the second linear path.

12. An applicator assembly for applying a cord to a tire-building surface that is configured to rotate about an axis during cord application, the applicator assembly comprising:
- an applicator member including a roller with an application surface that is configured to apply the cord to the tire-building surface, the roller being configured to rotate about a roller axis when the application surface applies the cord to the tire-building surface;
- a first motor that is operatively coupled to the applicator member, the first motor being configured to rotate the applicator member about a first axis relative to the tire-building surface;
- a guide roller that is operatively coupled to the applicator member and is configured to align the cord to be collinear with the first axis before the cord contacts the application surface;
- a second motor that is operatively coupled to the applicator member, the second motor being configured to rotate the applicator member, the first motor, and the guide roller about a second axis that is perpendicular to the first axis, the first motor and the second motor lying along the second axis;
- a first linear positioner that is operatively coupled to the applicator member, the first linear positioner being configured to move the applicator member, the first motor, and the second motor in a first linear path relative to the tire-building surface; and
- a second linear positioner that is operatively coupled to the applicator member and is configured to move the applicator member, the first motor, the second motor, and the first linear positioner in a second linear path that is perpendicular to the first linear path.

13. The applicator assembly of claim 12 further comprising:
- a resilient member that is operatively coupled to the applicator member and is configured to compress when the roller applies the cord to the tire-building surface.

14. The applicator assembly of claim 13 wherein the resilient member is compressible along a third axis that is parallel to and offset from the first axis.

15. The applicator assembly of claim 12 wherein the first axis intersects the roller axis.

16. A system for applying a cord to a core member having a tire-building surface and an axis of rotation about which the core member rotates, the system comprising:
- a spindle that is configured to rotate the core member about the axis of rotation; and
- an applicator assembly including an applicator member with an application surface that is configured to apply the cord to the tire-building surface, a first motor that is operatively coupled to the applicator member and is configured to rotate the applicator member about a first axis relative to the tire-building surface, a second motor that is operatively coupled to the applicator member and is configured to rotate the applicator member about a second axis that is perpendicular to the first axis, the first motor and the second motor lying along the second axis, the cord being collinear with the first axis through at least a portion of the applicator member, a first linear positioner that is operatively coupled to the applicator member and is configured to move the applicator member in a first linear path relative to the tire-building surface, and a second linear positioner that is operatively coupled to the applicator member and is configured to move the applicator member in a second linear path perpendicular to the first linear path, one of the first linear path and the second linear path being parallel to the axis of rotation,
- wherein as the spindle rotates the core member, the first motor, the second motor, the first linear positioner, and the second linear positioner are configured to move the applicator member in a predetermined manner relative to a position of the core member to apply the cord in a predetermined pattern to the tire-building surface.

17. The system of claim 16 wherein the applicator member is a roller and is configured to rotate about a roller axis, wherein the axis of rotation and the first axis are coplanar and the roller axis intersects the first axis.

18. The system of claim 16 further comprising:
- a resilient member that is operatively coupled to the applicator member and is configured to compress when the applicator member applies the cord to the tire-building surface.

19. The system of claim 18 wherein the resilient member is compressible along a third axis that is parallel to the first axis.

20. The system of claim 16 further including a guide roller that is operatively coupled to the applicator member and is configured to align the cord to be collinear with the first axis before the cord contacts the application surface.

21. The system of claim 16 wherein the first linear positioner is configured to move the second linear positioner along the first linear path.

22. The applicator assembly of claim 16 wherein the first axis is coplanar with the axis of rotation.

* * * * *